US010878436B2

(12) United States Patent
Chen

(10) Patent No.: US 10,878,436 B2
(45) Date of Patent: Dec. 29, 2020

(54) METHOD AND SYSTEM FOR INTEGRATION AMONG CONTENT PUBLICATION, ADVERTISEMENT SERVICES, AND REWARDS COLLECTION

(71) Applicant: Joyce Chiayu Chen, Clyde Hill, WA (US)

(72) Inventor: Joyce Chiayu Chen, Clyde Hill, WA (US)

( * ) Notice: Subject to any disclaimer, the term of this patent is extended or adjusted under 35 U.S.C. 154(b) by 39 days.

(21) Appl. No.: 16/421,392

(22) Filed: May 23, 2019

(65) Prior Publication Data
US 2019/0275142 A1   Sep. 12, 2019

Related U.S. Application Data

(63) Continuation of application No. 14/866,757, filed on Sep. 25, 2015, now Pat. No. 10,339,558, which is a continuation-in-part of application No. 13/888,261, filed on May 6, 2013, now abandoned, which is a continuation of application No. 13/673,561, filed on Nov. 9, 2012, now abandoned.

(60) Provisional application No. 61/558,511, filed on Nov. 11, 2011.

(51) Int. Cl.
*G06Q 30/02* (2012.01)

(52) U.S. Cl.
CPC ..... *G06Q 30/0207* (2013.01); *G06Q 30/0273* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 2007/0118802 A1* | 5/2007 | Gerace | ............... | G06Q 30/0273 715/738 |
| 2009/0216636 A1* | 8/2009 | Eliason | ............... | G06Q 30/0277 705/14.73 |
| 2009/0258700 A1* | 10/2009 | Bright | ................... | A63F 13/814 463/31 |

(Continued)

OTHER PUBLICATIONS

"Revenue Opportunities for Video Content Owners" (Arlene Lee; published online on Apr. 3, 2009 at https://adsense.googleblog.com/2009/04/revenue-opportunities-for-video-content.html) (Year: 2009).*

*Primary Examiner* — James M Detweiler

(57) ABSTRACT

Methods and systems for managing content related to Sustainable Development Strategies (SDS) may include a processor for receiving content comprising standardized data. The standardized data may include monetary valuations. The processor may be configured to store the received content in a storage device, and communicate with a content publication module and the storage device to publish the SDS content. In an embodiment, the processor may be configured to allow for searching of the published content by criteria based on the standardized SDS content. In an embodiment, the publication of submitted contents may be limited to a first predetermined number. The publication limit may be increased from the first predetermined number to a second predetermined number when a first predetermined threshold is reached. To encourage new quality content, additional increase in the number of contents that may be published may be allowed if additional predetermined thresholds are met.

17 Claims, 33 Drawing Sheets

(56) References Cited

U.S. PATENT DOCUMENTS

| | | | |
|---|---|---|---|
| 2010/0042660 A1* | 2/2010 | Rinearson | G06F 16/748 |
| | | | 707/E17.116 |
| 2010/0293016 A1* | 11/2010 | Spektor | H04L 63/102 |
| | | | 705/7.28 |
| 2013/0332143 A1* | 12/2013 | Leszczenski | G06F 40/51 |
| | | | 704/2 |
| 2014/0278942 A1* | 9/2014 | Buffamanti | G06Q 50/01 |
| | | | 705/14.45 |

* cited by examiner

Congratulations! You may draft 23 Sustainable Development Strategies (SDS) at this moment.

| | 126 — Title | 128 — Category | 130 — Date |
|---|---|---|---|
| | Joyce sds22 | Chemistry | 2012-08-20 14:57:05 |
| | Joyce sds21 | Food | 2012-08-20 14:46:57 |
| | Joyce sds20 | Waste | 2012-08-17 10:03:33 |
| | Joyce sds19 | forests | 2012-08-17 09:30:18 |
| | Joyce sds18 | Waste | 2012-08-17 09:26:51 |
| | Joyce sds17 | Waste | 2012-08-17 09:21:45 |
| | Joyce sds16 | Biodiversity | 2012-05-15 15:52:28 |
| | Joyce sds15 | Agriculture | 2012-03-25 02:53:44 |
| | Joyce sds14 | Energy | 2011-12-30 18:18:31 |

FIG. 3B

TwoMouths™ GET REWARDED!

| Joyce's Mission Office | News | Biography | Alliance | Translators | SDS(22) | Memo | GRE(2) | Briefings | Q&A | Leave |

Return to my Mission office ~180
For every 5 recommendations you earn on any of your published SDS and memos, you will gain an opportunity to price and sell a parcel of Green Real Estate (GRE)!

Bidding Name: joyceC  [Change] ~182
Paypal Account: joyce@gmail.com  [Change]
Note: Please provide your PayPal account email.

Seller
 Available opportunities to sell your GRE (price your GRE!) ~184
GRE you are currently selling ~186
GRE you have sold and didn't sell ~188
Blocked list ~194

Buyer
GRE you are bidding and your bidding history ~190
GRE you have won via bidding (view payment status/upload your content here) ~192

FIG. 4A

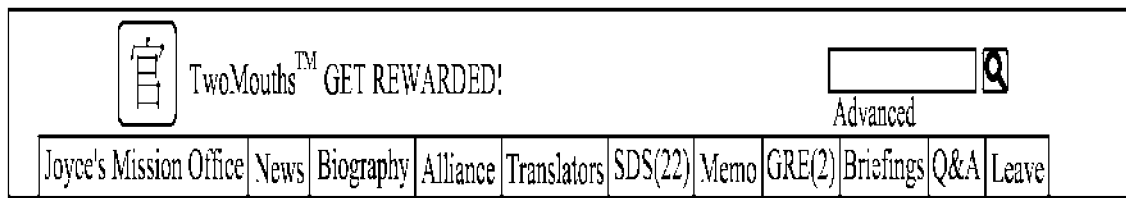
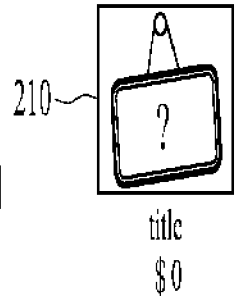
FIG. 4C

| | TwoMouths™ GET REWARDED! | | | | | | | | | Advanced 🔍 |
|---|---|---|---|---|---|---|---|---|---|---|
| Joyce's Mission Office | News | Biography | Alliance | Translators | SDS(22) | Memo | GRE(2) | Briefings | Q&A | Leave |

Return to Main Menu of "Manage My Green Real Estate (GRE)"

[All] [Paid] [Unpaid] [Unsold]

| | 242 | 244 | 246 | 248 | 250 | 252 | 254 | 256 | |
|---|---|---|---|---|---|---|---|---|---|
| | SDS/Memo | GRE | Base Price | Highest Bid | Bidder Name | Start | End | Your Revenue Transaction ID | |
| ? | Joyce sds17 | GRE12 | US$22 | US$27 | Sara Smith | 2012-08-17 10:14:37 | 2012-08-17 10:29:44 | US$18.9 8AC3846... | Block ~258<br>Feedback ~260<br>Cancel |
| ? | Joyce sds17 | GRE25 | US$18 | US$21 | Sara Smith | 2012-08-17 10:15:22 | 2012-08-17 10:29:33 | US$14.7 3LW3905... | Feedback uploaded |
| ? | Joyce sds20 | GRE28 | US$5 | US$10 | Sara Smith | 2012-08-17 10:22:30 | 2012-08-17 10:28:56 | US$7 2125946... | Feedback |
| ? | Joyce sds1 | GRE36 | US$88 | US$88 | Keiko Sasaki | 2011-08-23 17:35:51 | 2011-09-06 17:35:51 | US$61.6 OWV2909... | Block Feedback Cancel |
| ? | Joyce sds1 | GRE58 | US$66 | US$66 | Denny Browstein | 2011-08-23 17:26:02 | 2011-09-06 17:26:02 | US$46.2 OI36321... | Block Feedback Cancel |

| | TwoMouths™ GET REWARDED! | | | | | | | | | | Advanced 🔍 |
|---|---|---|---|---|---|---|---|---|---|---|---|
| Joe's Mission Office | News | Biography | Alliance | Translators | SDS(22) | Memo | GRE(2) | Briefings | Q&A | Leave |

Return to Main Menu of "Manage My Green Real Estate (GRE)"
The following list shows your Green Real Estate (GRE) Bidding Records:

|     | 264 | 266 | 268 | 270 | 272 | 274 | 276 |
|-----|-----|-----|-----|-----|-----|-----|-----|
|     | GRE | Seller Name | Base Price | Highest Bid | Highest Bidder | Start | End |
| 262 → ? | GRE1 | Sara Smith | US$1 | US$3 | KatieN | 2012-09-05 22:01:49 | 2012-09-19 22:01:49 |
| ? | GRE2 | Sara Smith | US$3 | US$5 | Joe | 2012-09-05 22:02:26 | 2012-09-19 22:02:26 |
| ? | GRE3 | Sara Smith | US$5 | US$7 | Bob | 2012-09-05 22:03:04 | 2012-09-19 22:03:04 |
| ? | GRE4 | Joyce Chen | US$2 | US$2 | Joe | 2012-09-05 21:18:33 | 2012-09-19 21:18:33 |
| ? | GRE3 | Joyce Chen | US$25 | US$27 | Joe | 2012-09-05 21:16:35 | 2012-09-19 21:16:35 |
| ? | GRE5 | Joyce Chen | US$11 | US$18 | Joe | 2012-09-05 21:18:48 | 2012-09-19 21:18:48 |

FIG. 4F

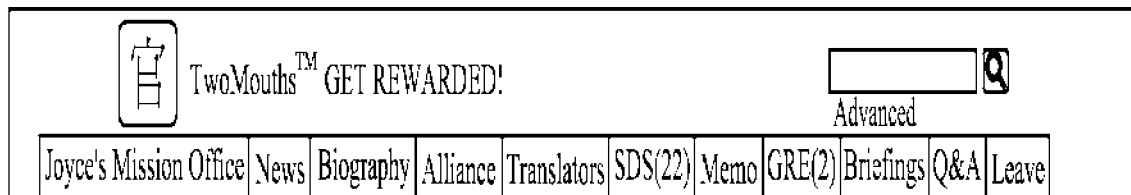

You are sharing your item to: joyce sds18

Congratulations! You have successfully acquired a parcel of Green Real Estate (GRE)! Thank you very much for your payment. You may now upload and image, a title, a description of what you wish to advertise or show (could be your product, company or even yourself!) and a link*.

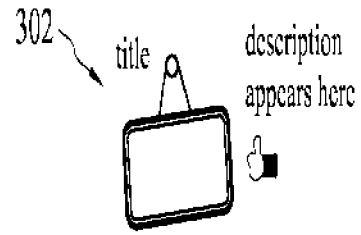

302 — title, description appears here

304 — image: [____] Browse upload
306 — title: [____]
308 — descriptions: [____]
310 — link: http://www.

312 — Submit  Preview  Cancel

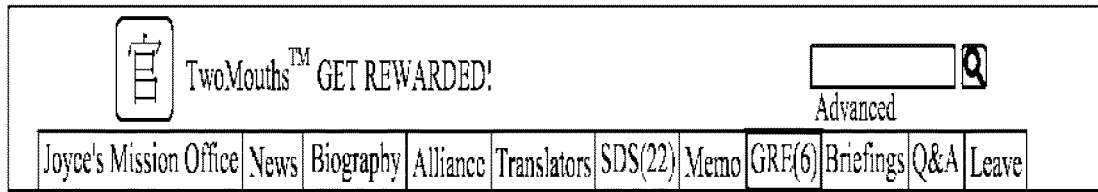
378 — Joyce's Green Real Estate (GRE) transcation rating
380 — Joyce's other Green Real Estate (GRE) For sale!
382 — GRE5
384 — SDS/Memo:   Joyce sds18
386 — Start:        2012-09-05 21:18:48
388 — End:          2012-09-19 21:18:48
390 — Base Price:   US$11
392 — Description:  The description of the for-sale Green Real Estate (GRE) appears here...
394 — Bids:         5
       Viewers:     18
395 — Bidding Price: US $ [          ]
[Place bid]
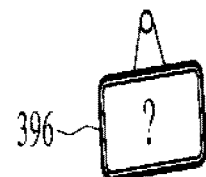
| Bidder (398) | Bid Amount (400) | Bid Date Time (402) |
|---|---|---|
| Joe | US$18 | 2012-09-05 21:42:14 |
| Bob | US$17 | 2012-09-05 21:41:00 |
| Joe | US$16 | 2012-09-05 21:38:42 |
| KatieN | US$15 | 2012-09-05 21:33:51 |
| TomM | US$12 | 2012-09-05 21:20:25 |
FIG. 6B

| | |
|---|---|
| Name: | Joyce Chen |
| Gender: | Female |
| Birth month and year: | Aug/1900 |
| Nationality: | American(United States) |
| Current location: | Seattle, WA |
| Mother tongue: | Chinese(Traditional) |
| Other languages: | English, Japanese and Taiwanese |
| Available as a translator: | Yes |
| My carbon footprint: | My carbon footprint is.. |
| How I calculate my carbon footprint: | I use the Nature Conservancy's Carbon Footprint Calculator |
| My carbon footprint calculator(link): | Click to view |
| My green philosophy: | My green philosophy is.. |
| Work experience: | Various places |
| College/University: | Uviversity of Southern California |
| Granduate school(s): | Columbia University, University of Washington |
| Awards/Recognitions: | Awards.. |
| Publications: | Reports and publications.. |
| Email: | joyce@gmail.com |
| Phone number: | 123456789 |
| Address: | 123 100th street |
| Website(s): | http://www.twomouths.com |

FIG. 7A

| | | |
|---|---|---|
| | Name: | Scott Cohen |
| | Gender: | Male |
| | Birth month and year: | Jan/1908 |
| | Nationality: | American(United States) |
| 416—Add as alliance | Mother tongue: | English |
| 418—Add as translator | Other languages: | French |
| | Available as a translator: | Yes |
| | My carbon footprint: | 123456789 |
| | How I calculate my carbon footprint: | This is how I calculate my carbon emissions. |
| | My carbon footprint calculator(link): | Click to view |
| | My green philosophy: | My green philosophy is.. |
| | | More/ Less |
| | Work experience: | Various companies/organizations. |
| | Volunteer experience: | Various places.. |
| | College/University: | UCLA |
| | Granduate school(s): | Harvard |
| | Awards/Recognitions: | Too many awards to list.. |
| | Publications: | Too many publications to list... |
| | Phone number: | 123456789 |
| | Address: | New York, NY |

FIG. 7B

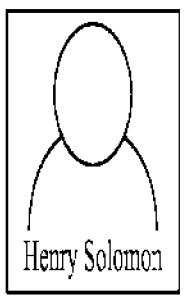
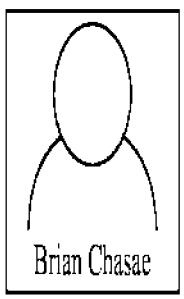
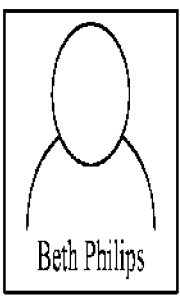
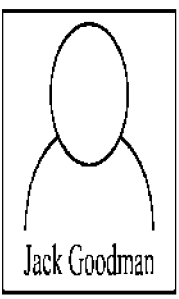
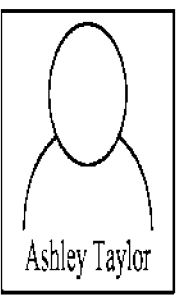
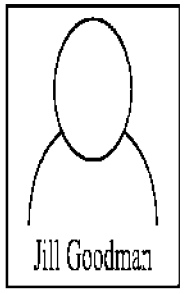
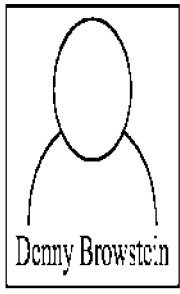
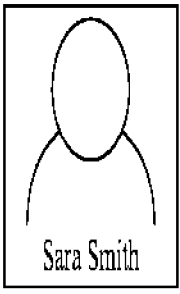
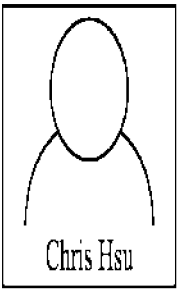
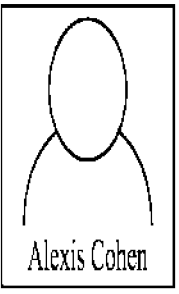
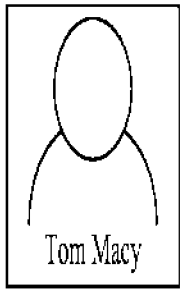
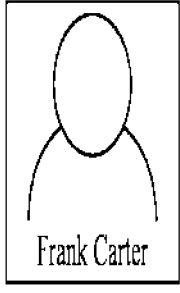
FIG. 7C

| TwoMouths™ GET REWARDED! | | | | | | | | | Advanced 🔍 |
|---|---|---|---|---|---|---|---|---|---|
| Joyce's Mission Office | News | Biography | Alliance | Translators | SDS(22) | Memo | GRE(2) | Briefings | Q&A | Leave |
You have 15 translators.
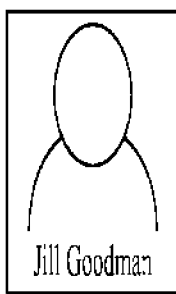 Jill Goodman 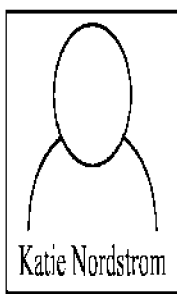 Katie Nordstrom 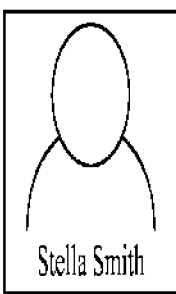 Stella Smith 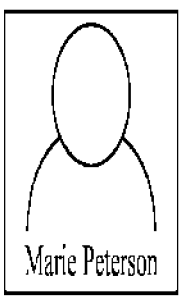 Marie Peterson 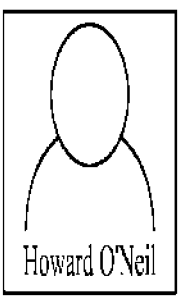 Howard O'Neil
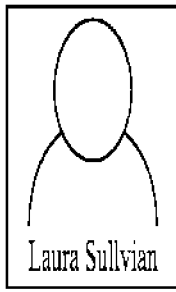 Laura Sullvian 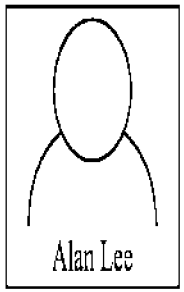 Alan Lee 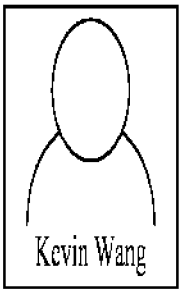 Kevin Wang 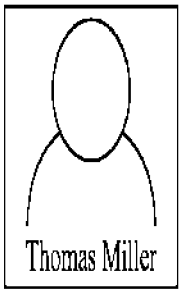 Thomas Miller 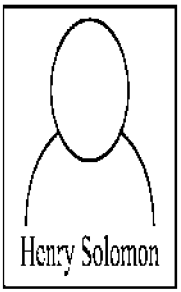 Henry Solomon
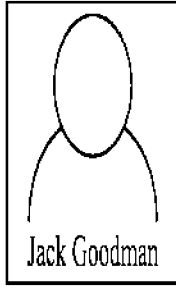 Jack Goodman 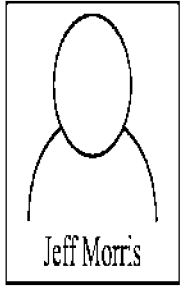 Jeff Morris 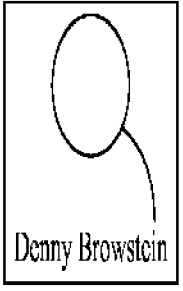 Denny Browstein 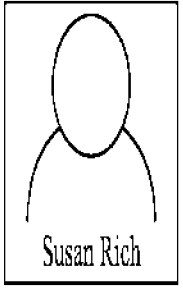 Susan Rich 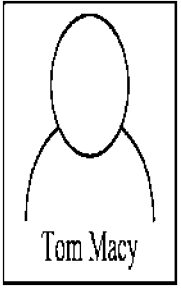 Tom Macy
FIG. 7D

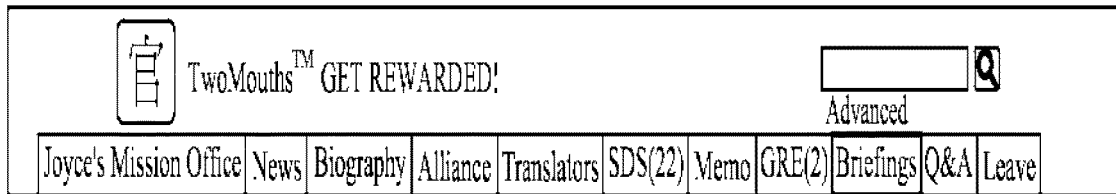

Publish a briefing

420 → Columbia University
2012-08-04 21:18:02

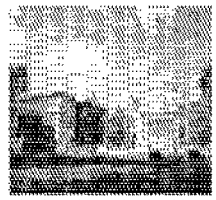

This is a photo of Columbia University's Morningside Campus.

422 → Jeffrey Sachs, Columbia
University Earth Institue
2012-09-04 21:09:20
1 recommender

And Because Asia is by far the fastest growing party of the world. And if Asia were to grow by replicating the kind of technologies of Europe and the United States simply to scale up, to have the 424 → Seattle
2012-09-04 21:07:55

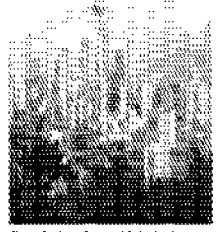

Seattle is a beautiful city.'

426 → CNN
2012-09-04 21:07:02

http://www.cnn.com
A great news website!

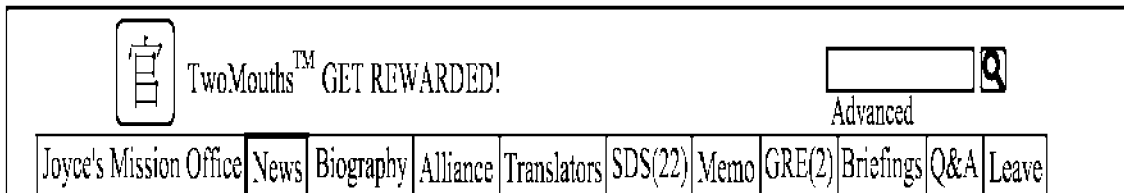

| | TwoMouths™ GET REWARDED! | | | | | | | | | Advanced 🔍 |
|---|---|---|---|---|---|---|---|---|---|---|
| Joyce's Mission Office | News | Biography | Alliance | Translators | SDS(22) | Memo | GRE(2) | Briefings | Q&A | Leave |

468  Sara is now selling a parcel of Green Real Estate titled "GRE3" on 2012-09-05 22:03 — 470

 Sara is now selling a parcel of Green Real Estate titled "GRE2" on 2012-09-05 22:02

 Sara is now selling a parcel of Green Real Estate titled "GRE1" on 2012-09-05 22:02

 Sara has published an SDS titled "sara sds11" on 2012-09-05 20:43 — 472

 Frank has just published a Memo titled "test1" on 2012-09-05- 19:49

 Sara has just published a Memo titled "test1" on 2012-09-05- 19:47

 Jill has added a translation to "joyce sds16" in French on 2012-09-05- 18:58 — 474

 Tom has added a translation to "joyce sds20" in Spanish on 2012-09-05 18:57

 Sara has added a translation to "joyce sds22" in Chinese(Traditional) on 2012-09-05 18:56

 Sara is now selling a parcel of Green Real Estate titled "GRE2" on 2012-09-03 20:34

FIG. 10

METHOD AND SYSTEM FOR INTEGRATION AMONG CONTENT PUBLICATION, ADVERTISEMENT SERVICES, AND REWARDS COLLECTION

CROSS REFERENCE TO RELATED APPLICATIONS

This is a continuation of U.S. patent application Ser. No. 14/866,757, filed Sep. 5, 2015, which is a continuation-in-part of U.S. patent application Ser. No. 13/888,261, filed on May 6, 2013, which is a continuation of U.S. patent application Ser. No. 13/673,561 filed on Nov. 9, 2012, which claims the benefit of U.S. provisional application No. 61/558,511, filed Nov. 11, 2011, all of which are hereby incorporated herein by reference.

FIELD OF THE INVENTION

The present invention generally relates to managing electronic data and content and more particularly to managing electronic data and content related to sustainable development strategies.

BACKGROUND

Combating climate change, controlling greenhouse gas emissions and creating holistic yet practical sustainable development strategies are crucial in meeting the goals of sustainable development worldwide and allowing the human race to live in harmony with nature. According to the United Nations Department of Economic and Social Affairs, Division for Sustainable Development, Chapter 8 of Agenda 21 encourages countries to develop National Sustainable Development Strategies (NSDS) that synchronize and complement each country's economic, social and environmental policies and plans. Produced as a result of the United Nations Conference on Environment and Development (UNCED) in Janeiro, Brazil, in 1992, Agenda 21 is a comprehensive action plan that provides environmental guidance globally. In 1997, the Special Session of the United Nations' General Assembly again emphasizes the importance of NSDS and asks countries to formulate their NSDS by 2002. Further, the World Summit for Sustainable Development (WSSD) advocates countries to implement their NSDS by 2005. Recently, the United Nations Millennium Declaration urges countries to incorporate principles of sustainable development into national policies and programs (http://www.un.org/esa/dsd/dsd_aofw_nsds/nsds_index.shtml).

The importance of developing comprehensive NSDS that consider environmental, economic and social aspects of sustainable development is clear through various international agencies' meetings and declarations. However, there are issues with the current method of reporting NSDS and the format of exchanging sustainable development related information and/or public policies.

SUMMARY

An embodiment of a data management system for sustainable development strategies (SDS) content comprising standardized data may include: a server storage device configured to receive a predetermined number of first generated contents, wherein the first generated contents comprises standardized data; a content publication module configured to publish the first generated contents, wherein each of the published first generated contents is eligible to earn an increase in a number of contents that can be generated and published and a user-controlled slot; and a processor in electronic communication with the server storage device and content publication module. The processor may be configured to manage the standardized data in a database for searching; determine whether a first predetermined condition of the published first generated contents reaches a first predetermined threshold; when the first predetermined threshold is reached, allow user management of at least one criterion for using a first user-controlled slot and communicate with the server storage device and the content publication module to allow a predetermined number of second generated contents to be received and published; determine whether a first predetermined condition of published second generated contents reaches a second predetermined threshold; and when the second predetermined threshold is reached, allow user management of at least one criterion for using a second user-controlled slot and communicate with the server storage device and the content publication module to allow a predetermined number of third generated contents to be received and published, and means for allowing a first user to set a first price for the first slot.

BRIEF DESCRIPTION OF THE DRAWINGS

Reference will now be made in detail to the invention and embodiments thereof, examples of which are illustrated in the accompanying drawings. Wherever possible, the same reference numbers will be used throughout the drawings to refer to the same or like portions. In the drawings:

FIG. 3B is an exemplary screen showing the information a user may supply in order to publish an SDS;

FIG. 4A is an exemplary screen showing the main menu for managing a user's Green Real Estate (GRE);

FIG. 4C is an exemplary screen showing the information a user is requested to supply in order to price his/her GRE;

FIG. 4E is an exemplary screen showing the transaction history of a user's sold (both paid and unpaid) and unsold parcels of GRE;

FIG. 4F is an exemplary screen showing the parcels of GRE a user is currently bidding;

FIG. 4H is an exemplary screen showing the information a user is requested to supply in order to "construct" his/her GRE;

FIG. 5A is an exemplary screen showing a published SDS that has earned recommendations and contains for-sale GRE;

FIG. 5B is an exemplary screen showing a published SDS when bidders of GRE have completed payments and uploaded contents he/she wishes to display;

FIG. 6B is an exemplary screen showing the details of the for-sale GRE illustrated in FIG. 6A;

FIG. 7A is an exemplary screen showing a user's biography;

FIG. 7B is an exemplary screen showing how a user may access the system in order to view another user's biography;

FIG. 7C is an exemplary screen showing how a user may access the system in order to view another user's or his/her own list of alliance;

FIG. 7D is an exemplary screen showing how a user may access the system in order to view another user's or his/her own list of translators;

FIG. 8A is an exemplary screen showing how a user may access the system in order to view another user's or his/her own list of published briefings;

FIG. 8C is an exemplary screen showing how a user may access the system in order to publish a "Photos" type of briefing;

FIG. 8D is an exemplary screen showing how a user may access the system in order to publish a "Videos" type of briefing;

FIG. 9 is an exemplary screen showing how a user may access the system in order to participate in Q&A sessions;

FIG. 10 is an exemplary screen showing how a user may access the system in order to view updates of his/her alliance.

DETAILED DESCRIPTION

Figure 1:
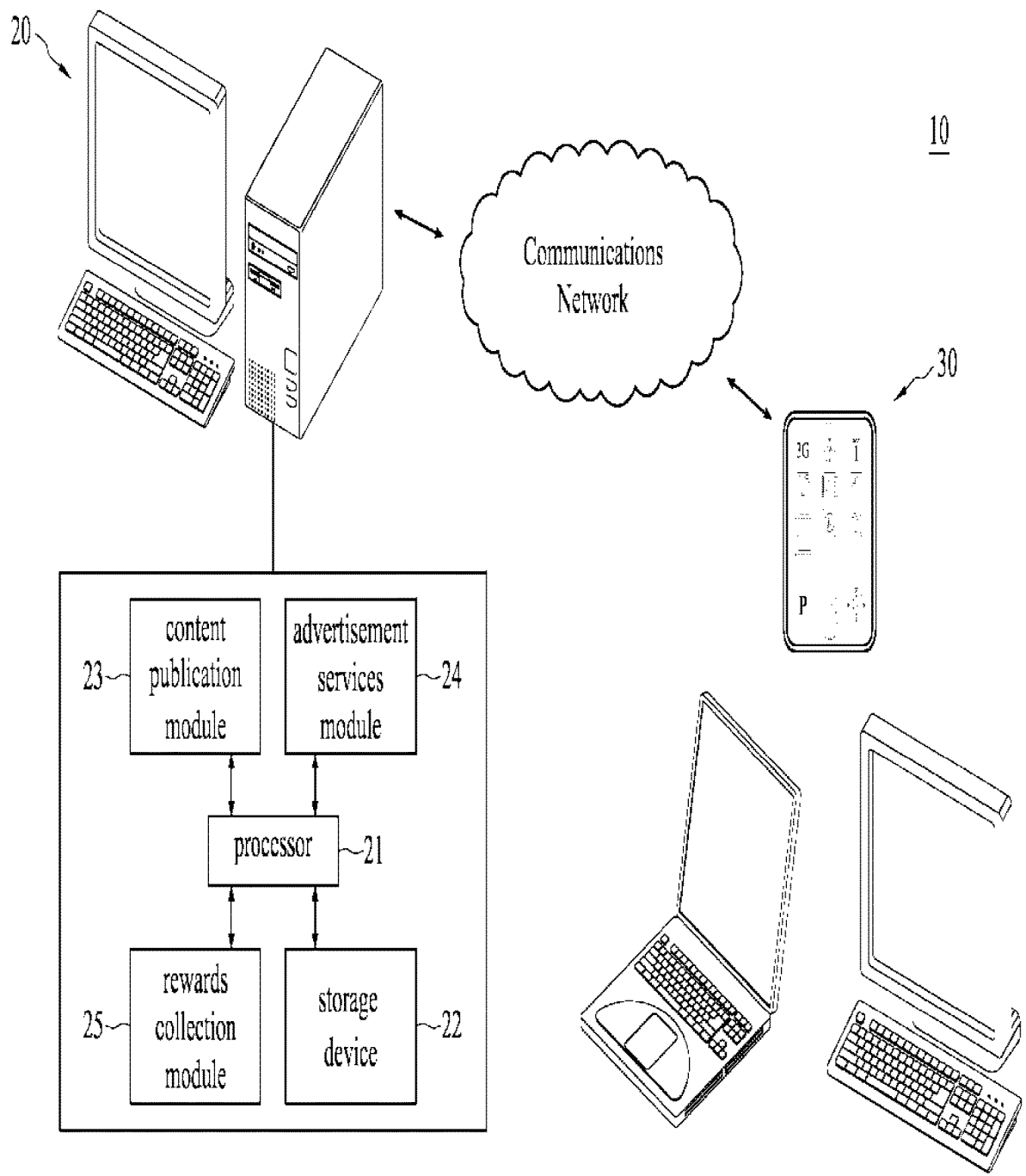
FIG. 1 is a diagram of an exemplary system for integration among content publishing, advertisement services and rewards collection in accordance with an embodiment of the present invention.

Throughout the specification, environment and/or sustainable development will be used as an example of published content when describing the embodiments of the present invention. Nevertheless, the present invention is equally applicable to other types of contents. A user may publish anything he/she wishes and still be able to earn financial rewards.

While some countries have published their NSDS and even made them accessible on the Internet and through the United Nations' web portal, citizens of various countries often do not know how to look them up or how to translate the abundance of information into a commonly understandable and concise format.

NSDS is often presented in only one or two languages and thus does not efficiently address the pressing global issue of sustainable development and assist with the exchange of such information among nations.

Even if NSDS readers and researchers can acquire information regarding countries' NSDS via an electronic medium, such as a database or the Internet, the format is often not interactive. That is, readers and researchers cannot easily comment, recommend or help to translate the NSDS into other languages to help raise awareness on countries' NSDS or any NSDS in general. Further, readers and researchers cannot communicate with each other easily, find translators to help them to understand a particular NSDS or make alliance to share thoughts or feelings of approval/disapproval on certain NSDS.

It can be difficult for readers and researchers to find out the authors of the NSDS or an overall spokesperson for a country's NSDS. As a result, the authors of the NSDS, the readers, the researchers, the policy makers, cannot easily ask or respond to questions to help each other to improve the NSDS and benefit sustainable development overall.

NSDS is presented by countries using different units, standards, languages and formats. This can cause confusion, especially for a country's policy makers, researchers and citizens trying to understand other countries' NSDS and sustainable development practices.

As the name suggested, National Sustainable Development Strategies (NSDS) are holistic environmental strategies at the national level. While they are based on and intended for each country's numerous corporations, organizations and individuals' activities, the corporations, organizations and individuals often cannot report or share publicly via an electronic medium their own Personal Sustainable Development Strategies in a standardized and commonly understandable format. For example, an individual may have a useful Personal Sustainable Development Strategy to share with the public, but via the current method, he/she cannot easily showcase his/her ideas in a standardized format and interact with his/her audience. Companies that have created "green products" or certain sustainable practices may also wish to share their product-specific or company-specific Sustainable Development Strategies.

Besides the issues mentioned above, there are also problems with the way a user is receiving rewards, especially financial rewards/compensation, for publishing content online or via an electronic medium such as blogs or social-networking services. For example, if a user were to publish his/her sustainable development related strategies/ideas/information or any content in general on his/her blogs/websites while hoping to receive financial rewards for his/her content contribution by using advertisement services (such as Google AdSense), he/she may face the following issues:

A user would have to apply in order to utilize/install many advertisement services. A user could be denied from using such services initially if he/she did not receive enough visitors/viewers on his/her websites and/or blogs. In that case, if a user happens to have a useful Sustainable Development Strategy or wishes to publish any content in general on his/her websites/blogs but did not meet the "number of visitors" requirement initially, he/she will not be able to receive financial rewards right away for his/her content contribution and publications.

Advertisement services such as Google AdSense often claim one of its main features is profit-sharing. That is, advertisement services in general will share the amount of money they collect from advertisers with the content publishers or the website owners who use their advertisement services. However, these advertisement services generally may not state exactly the amount of money they collect from the advertisers. Moreover, the profit-sharing plans between the advertisement services and the content publishers who use their services are not entirely clear. For example, sometimes a content publisher would not know if he/she is collecting exactly 30 percent or 60 percent of the profits or the revenue advertisement services collect from the advertisers. The revenue/profits share is often not fully disclosed.

Content publishers or website owners who use Google AdSense or similar services often have to wait until they pass a certain "threshold" (such as waiting until their earnings gained from people clicking on or simply viewing the advertisements to reach $100) in order to receive their financial rewards. Such process could take long, up to weeks or months or even years for some, in order for the content publishers to receive their financial rewards (such as in the form of a check).

For most content publishers or website owners who utilize advertisement services on their blogs/websites, their earnings are based on cost-per-click (CPC) or cost-per-thousand-impression (CPM). This means a content publisher will generate earnings when someone else (other than him/herself) clicks on the ads or when an impression occurs. If neither happens, a content contributor/website owner may not be able to generate revenue.

For most content publishers or website owners who use Google AdSense or similar services, they do not have the opportunities to decide on the value of their content/blogs/websites and/or the prices of their slots for advertisements. That is, content publishers/website owners cannot set "base prices" for their available slots for advertisements. For example, a user may decide that his/her advertisement slot is worth at least $50.00 and interested advertisers need to bid at least equal to or greater than the base price. Most advertisement services let advertisers decide on the value of the slots through auctions instead of letting content publishers decide on the value of their advertisement slots.

Advertisement services (such as Google AdSense) claim that ads compete in an ad auction and their system automatically select those that generate the most revenue. However, users who install the advertisement services may not be able to participate fully in order to see who are bidding on their advertisement slots to make certain that the ad auction is truly selecting those that generate the most revenue.

According to the present invention, a method and system is provided to address the above issues. This method and system allows users to report and exchange Sustainable Development Strategies (SDS) at the personal level as well as the national level. Personal refers not only to individuals but also companies, corporations, organizations, schools, families and any type of organized body other than each country's representative government body. National, on the other hand, refers to the governing body of a nation, state and/or community.

Furthermore, this method and system allows users to exchange environmentally friendly strategies, ideas, acts, policies, trends, products, information and any other international affairs, political information, related information and any information in general internationally and without language barriers to benefit sustainable development worldwide. Accordingly, people may become representatives of their countries without actually joining the government workforce or going through an election or attending international meetings such as the United Nations' General Assembly in person.

This method and system also allows users to build their international alliances, find translators, interact with SDS authors or content publishers in general, learn about different countries' SDS and "green culture" and sharpen language skills. Any individuals, companies, corporations, organizations, schools, families and any types of organized bodies may promote their SDS in a commonly understandable and concise format via this method and system.

Moreover, this method and system allows users to receive financial compensation for publishing content online. This system and method for receiving rewards, especially financial ones, and for publishing content online can be applied in general. That is, the content published does not necessarily have to relate to the exemplary environment and/or sustainable development.

The method and system in accordance with the present invention provides an interactive electronic SDS (and other related information) reporting, environmentally friendly strategies, ideas, acts, policies and information (or other general international affairs and political information) exchanging, and financial rewards receiving for publishing content online service employing a computer, a monitor, a database, the Internet and/or other electronic medium such as an iPad (or tablet PCs) and/or a mobile device.

The system can be accessed on the Internet by a user to allow full interactivity at all times. In one embodiment, the system can be built using PHP, MySQL, Apache, JavaScript, Ajax, JQuery, CSS and HTML. Alternatively, the system can be built using other common web programming languages such as ASP, JSP, Java, Python, Ruby or ColdFusion or other web programming languages, and other database technologies such as Oracle, Microsoft SQL Server, PostgreSQL or other common database technologies. Other technologies that can be used include but are not limited to: Flash, AJAX, Closure, Java Servlets, Big Table, Colossus, MapReduce, NoSQL, Cassandra, HBase.

FIG. 1 is a diagram of an exemplary system 10 for integration among content publishing, advertisement services and rewards collection in accordance with an embodiment of the present invention. Referring to FIG. 1, the system 10 may include a server 20 and a plurality of user devices 30. The server 20 and the user devices 30 may communicate with each other over a communications network (not numbered). The communications network may include the Internet or World Wide Web, a wide area network (WAN), a local area network (LAN), and/or an extranet. The user devices 30 may each include a computing device such as a personal computer, a personal digital assistant (PDA), a smart phone, a laptop, or other mobile devices.

The server 20 may include a processor 21, a storage device 22, a content publication module 23, an advertisement service module 24 and a rewards collection module 25. The role and function of each of the modules 23 through 25 will become clear as the method and system according to the present invention is described in subsequent embodiments.

Figure 2:
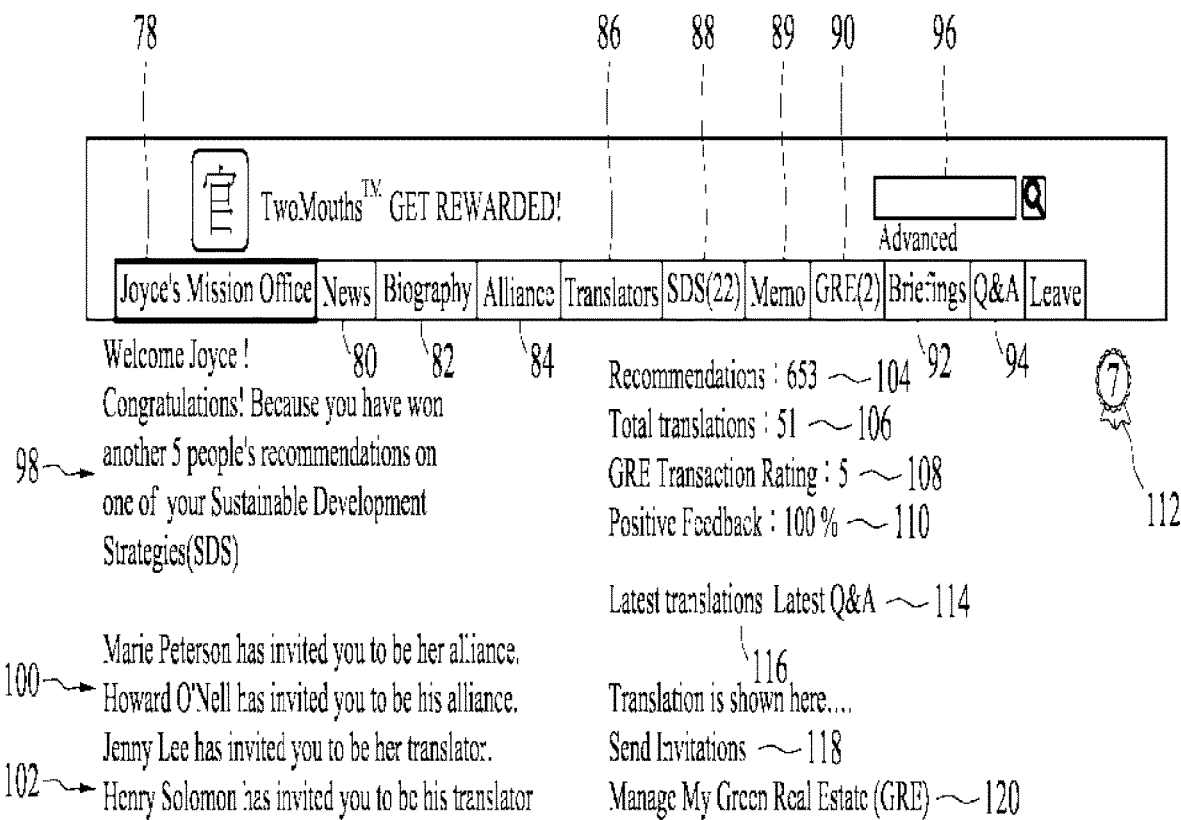
FIG. 2 is an exemplary screen showing a user's main menu page.

Initially, for a user to gain access to the system and method, he/she is requested to provide the required information in a login or registration process. The information may be entered on a PHP page transmitted over the Internet. Alternatively, if the web pages were created using other types of technologies, such as ASP, then the information required to create an account (or a "Mission Office") is entered on that technology-specific language. For first-time users, the information required includes but is not limited to first name, last name, gender, email, password, nationality, mother tongue and birth month and year. Upon registration of the system, a user will be assigned a person number (or an ID) and he/she can gain access to his/her "Mission Office," as shown in FIG. 2. For users who have already registered and obtained a person number (or an ID), he/she can simply log in the system with his/her email and password to gain access to his/her "Mission Office." An embodiment of the system allows a user to view the top three newest, most viewed, most recommended and most translated SDS without registering the system.

Alternatively, the system can be programmed so the number of SDS or contents available for public viewing without registering the system can vary. For example, five or all existing SDS or contents are available for public viewing without registering the system. The system can also be programmed so that a user is required to register in order to view any published SDS and other contents. Besides the newest, most viewed, most recommended and most translated SDS or contents, other categories can also be included, such as "most profitable" or "most savings."

FIG. 2 is an exemplary screen showing a user's main menu page, i.e., his/her Mission Office 78, after logging in the system. Referring to FIG. 2, a user may view updates of his/her alliance by selecting News 80, edit his/her biography by selecting Biography 82, view a list of his/her alliance by selecting Alliance 84 and a list of his/her translators by selecting Translators 86, publish his/her personal Sustainable Development Strategies by selecting SDS 88, publish other contents or materials other than SDS by selecting Memo 89, view his/her current for-sale "Green Real Estate" (i.e. slots available for advertisements) by selecting GRE 90, publish briefings by selecting Briefings 92 and ask/respond to questions by selecting Q&A 94.

As previously mentioned, the contents a user can publish are not limited to SDS that relate to the environment and/or sustainable development. For purposes of convenience, SDS are used as an example in various embodiments of the disclosure.

By typing in a nationality, a language or a name in field box 96, the processor 21 may allow a user to search for alliance and/or translators. In addition, a user may also search for published SDS and Memos by their titles, categories, author names and content keywords. Finally, a user may also search for the current for-sale GRE by their titles, content and bid amounts. The searching function can potentially search anything that exists in the system's database 22. The "Congratulations! . . . " message 98 informs a user when he/she gains another opportunity to publish another SDS and sell a parcel of GRE to gain potential financial rewards.

The "[user's first name] has invited you to be an alliance" message 100 informs a user when he/she receives an invitation from another user to form alliance. In the present example, Marie and Howard have invited Joyce (the owner of the Mission Office) to be an alliance.

The "[user's first name] has invited you to be a translator" message 102 informs a user when he/she receives an invitation from another user to become his/her translator. In the present example, Jenny and Henry have invited Joyce to be her/his translator.

Figure 8B:
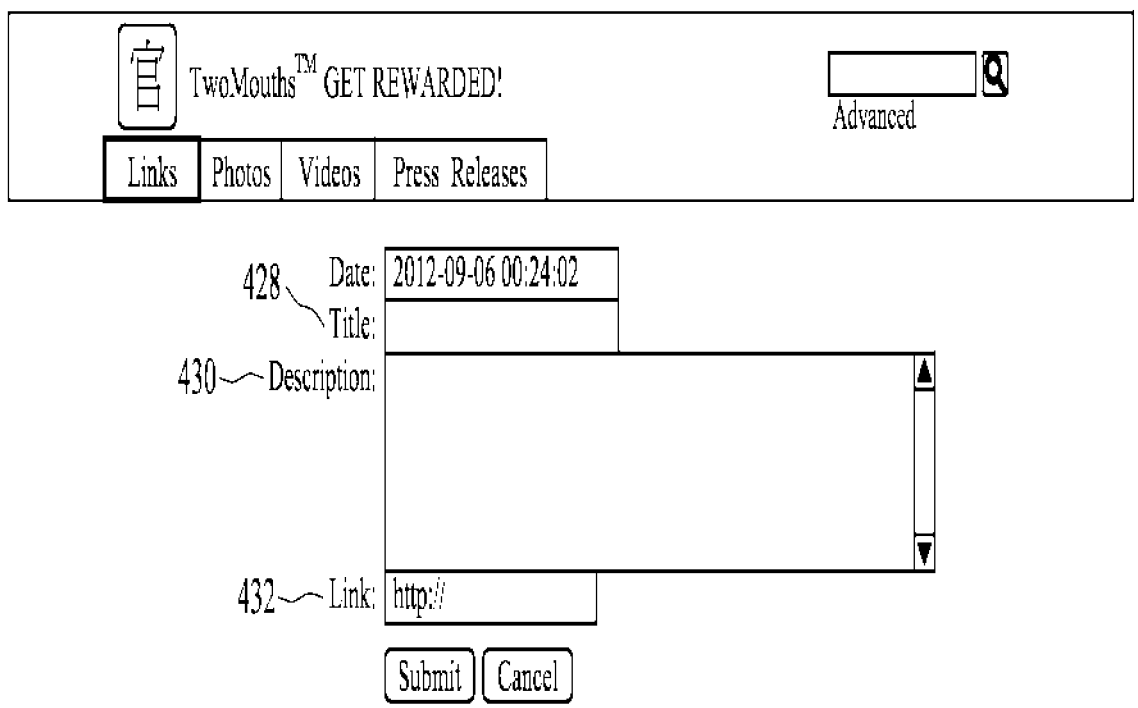
FIG. 8B is an exemplary screen showing how a user may access the system in order to publish a "Links" type of briefing.

Recommendations 104 indicates the total number of recommendations a user has earned from publishing effective SDS, informative briefings (which may include but is not limited to links, photos, videos and press releases, as shown in FIG. 8B), and helpful translations of SDS These are merely examples. The total number of recommendations can also include, for example, the recommendations a user has earned from publishing useful memorandums or contributing interesting questions and valuable answers or providing a detailed resume/biography etc.

Total translations 106 indicate the number of SDS a user has translated.

GRE Transaction Rating 108 indicates the feedback ratings a user has received from his/her buyers and/or sellers of GRE.

Positive Feedback 110 shows the percentage of positive ratings provided by buyers/sellers of a user's GRE. This is calculated by dividing the number of positive ratings by the sum of all positive and negative ratings (total number of ratings).

The number badge 112 shows a user's current "rank." A user's rank (which is shown by different number badges) can be based on the number of recommendations he/she has earn from publishing effective SDS and other types of content (such as "memos" or "briefings"). As mentioned, the intention of the system is to provide a platform where a user may share policies and information (especially those related to sustainable development) efficiently. Moreover, the mission of the system is to provide a platform where a user may become a government official or a representative of his/her country without holding an election or actually joining the government workforce. Therefore, the number badge may serve as an incentive for users to publish effective SDS and share quality content. As mentioned previously, however, the published contents are not limited to SDS and may include other types of contents.

The Latest Q&A 114 shows the most recent three questions and/or answers from Q&A 94.

Latest translations 116 shows the most recent three translations of a user's SDS.

Send Invitations 118 allows a user to invite people to use the system and method to become potential alliance, translators, recommenders and/or buyers of his/her GRE.

By selecting Manage My Green Real Estate (GRE) 120, a user may access the main menu of the selling/buying of GRE to gain financial rewards for publishing recommended SDS and Memos, as shown in FIG. 4A. The format of memorandums ("Memos") can be similar to a blog entry or a diary/journal entry.

Alternatively, besides showing updates of a user's alliance, News 80 can also include updates of a user's translators, such as his/her latest translations, for-sale GRE, newly published SDS and briefings etc. In addition, News 80 can also update a user on the latest news of sustainable development in general, for example, the policy changes regarding the carbon trading rules. Moreover, News 80 can also allow users to subscribe and obtain corporations/organizations/schools/products' latest updates and "green" product releases. Finally, News 80 can also include local, national and world news in general, providing users quick access to the latest information.

Regarding SDS 88 and Memo 89, in one embodiment, a first-time user may start with three opportunities to draft SDS and/or any other types of contents in Memo 89 initially. That is, a user may only publish three SDS and memorandums initially, unless he/she has earned at least five recommendations on one of them. As soon as a user earns at least five or more recommendations on one of his/her SDS or memorandums (that can contain any types of contents), he/she will then gain an opportunity to publish another SDS or memorandum. At the same time, he/she will gain an opportunity to price and sell a parcel of "Green Real Estate (GRE)," which is an empty space/slot (available for advertisements or other similar uses or other uses such as sending greeting cards) located next to the SDS or the memorandum where he/she gains the recommendations from. The system can provide a message indicating the number of SDS or memorandums a user is allowed to draft at the moment.

The reason for imposing a restriction or a predetermined condition on the number of SDS and the memorandums a user may publish or the number of recommendations a user must earn in order to sell slots available for advertisements is to ensure the quality of contents a user is uploading to the system. While online social networks such as Facebook and Twitter have provided users the convenience of publishing contents online easily and quickly, they also indirectly provide a way for users to share endless contents online without caring for the contents' quality, purposes and effect. Overabundance of information online can distract users from receiving truly educational and useful information, and at the same time, cause users to spend more time to filter through information to obtain what he/she truly desires to seek. Excess sharing of information is also propelling websites such as Google and Facebook to build more data centers to store the shared information. The construction of such buildings may not always have the best impact on the environments.

In one embodiment of the present invention, by imposing a restriction or creating a predetermined condition for the amounts of contents a user may publish or the number of recommendations a user must earn in order to sell a slot available for advertisements (aka GRE), the system creates a "filter" and incentives for users to upload quality contents. Only if a user's generated contents receive a certain number of recommendations can he/she be granted with opportunities to publish more contents and to sell parcels of GRE (i.e., slots located next to his/her generated contents that are available for advertisements or similar uses or other uses such as sending greeting cards) to make money. Therefore, when a user publishes well-thought-out contents, he/she will not only be rewarded with viewers' recommendations, he/she will also gain opportunities to sell slots available for advertisements to make money. At the same time, contrary to the common websites where a recommendation merely sends a virtual approval, in the embodiment mentioned above, a recommender of content can also help its author to receive potential income in addition to sending a virtual endorsement.

Alternatively, the system can be programmed so that each user may start with more or less than three opportunities to publish SDS or memorandums that can contain any types of content. This initial number can vary, or the system can be programmed in such a way that there will be no restrictions or predetermined conditions on the number of SDS or memorandums one may publish initially. In addition, the number of recommendations a user must earn in order to publish another SDS or memorandum, and to sell a parcel of GRE to make money can vary depending on how the system is programmed. For example, instead of earning at least five recommendations, the system can be programmed in such a way that a user must earn at least ten or even just two recommendations on the published SDS or memorandum in order to sell a slot available for advertisement. Another option is that the system does not have to impose any restrictions or predetermined conditions on the number of recommendations a user must earn in order to publish another SDS/memorandum or to sell a parcel of GRE. That is, a user may sell GRE without gaining any recommendations on his/her published SDS or memorandums (again, which can contain any types of contents).

The opportunities to publish more SDS or memorandums (which can contain any types of contents in general) and to sell GRE can also be programmed with other varieties. For example, a user may start with five SDS and is required to earn at least ten recommendations in order to publish two more SDS and sell three parcels of GRE. Again, the number of SDS/memorandums a user can publish initially, the number of recommendations he/she must earn to publish more SDS or memorandums or contents, and the number of slots he/she can sell for advertisements or other uses can range from zero to infinity.

The system can also be programmed so that if a user publishes a very effective SDS or a very useful memorandum and earns a large number of recommendations in a certain period of time, then he/she may be allowed to publish more SDS or memorandums than usual and/or sell more GRE than usual and/or earn a higher profit share when his/her GRE is sold.

Another alternative is that a user may not need to earn any recommendations to publish any more SDS or memorandums or to sell GRE. In other words, the restrictions on the number of SDS and memorandums one may publish and the number of opportunities one may sell GRE to make money may be eliminated. As such, a user may publish any number of SDS or memorandums he/she wishes, and none of his/her SDS or memorandums needs to earn any recommendations in order to sell GRE. Once a parcel of GRE is sold, the user and the owner of the system can share the revenue.

Figure 3A:
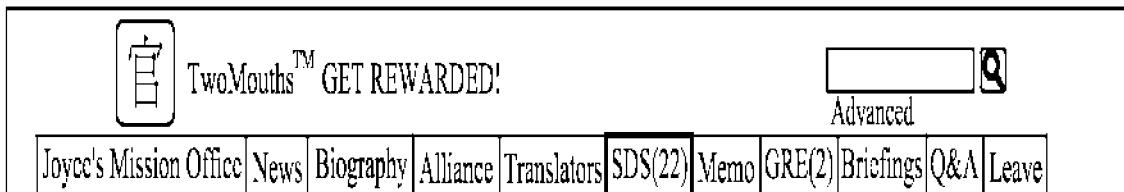
FIG. 3A is an exemplary screen showing how the Sustainable Development Strategy (SDS) tab may appear after a user gains more recommendations to publish more SDS.
Figure 3B:
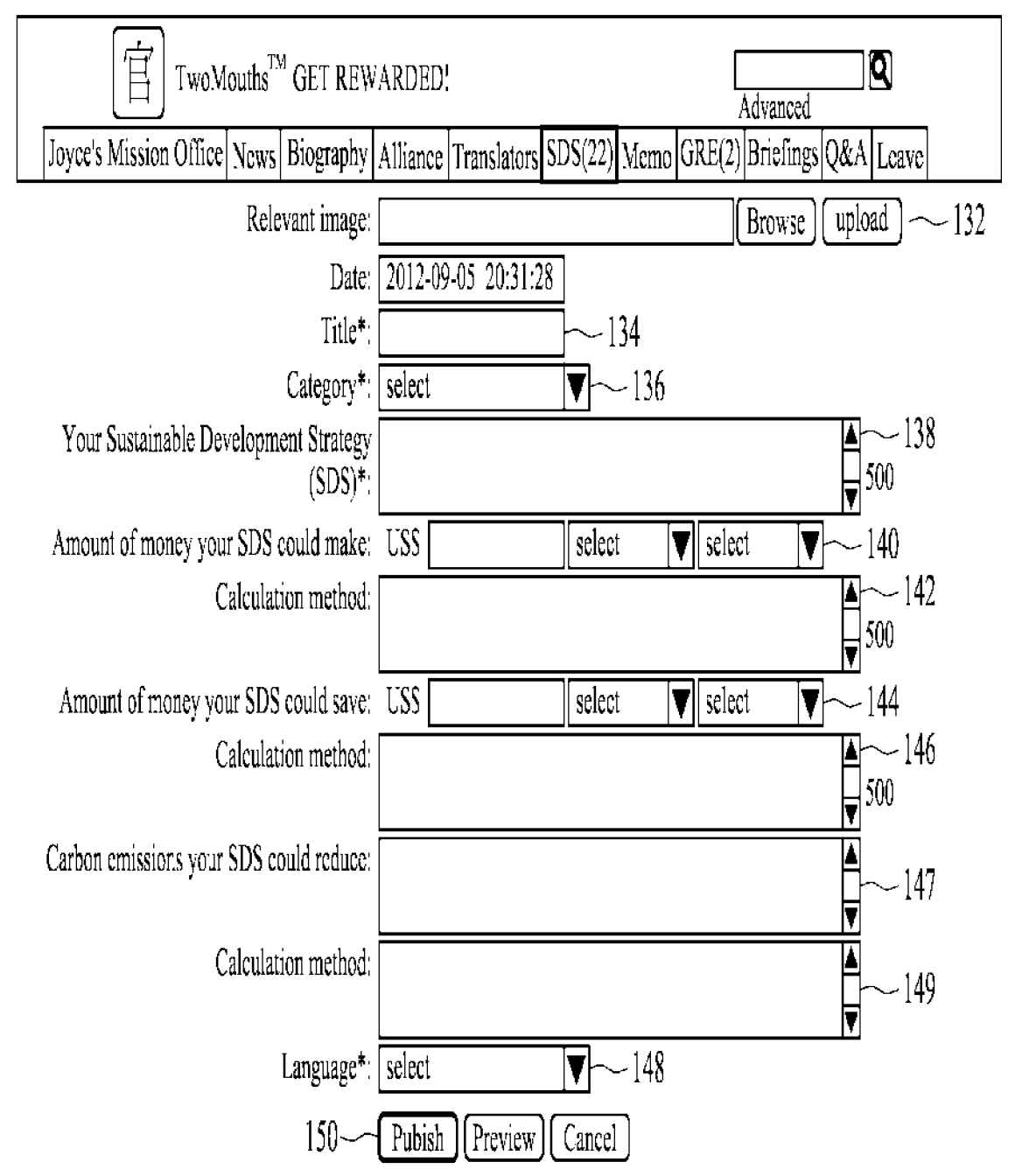
Figure 3C:
FIG. 3C is an exemplary screen showing how a published SDS may appear on the system.
Figure 5A:
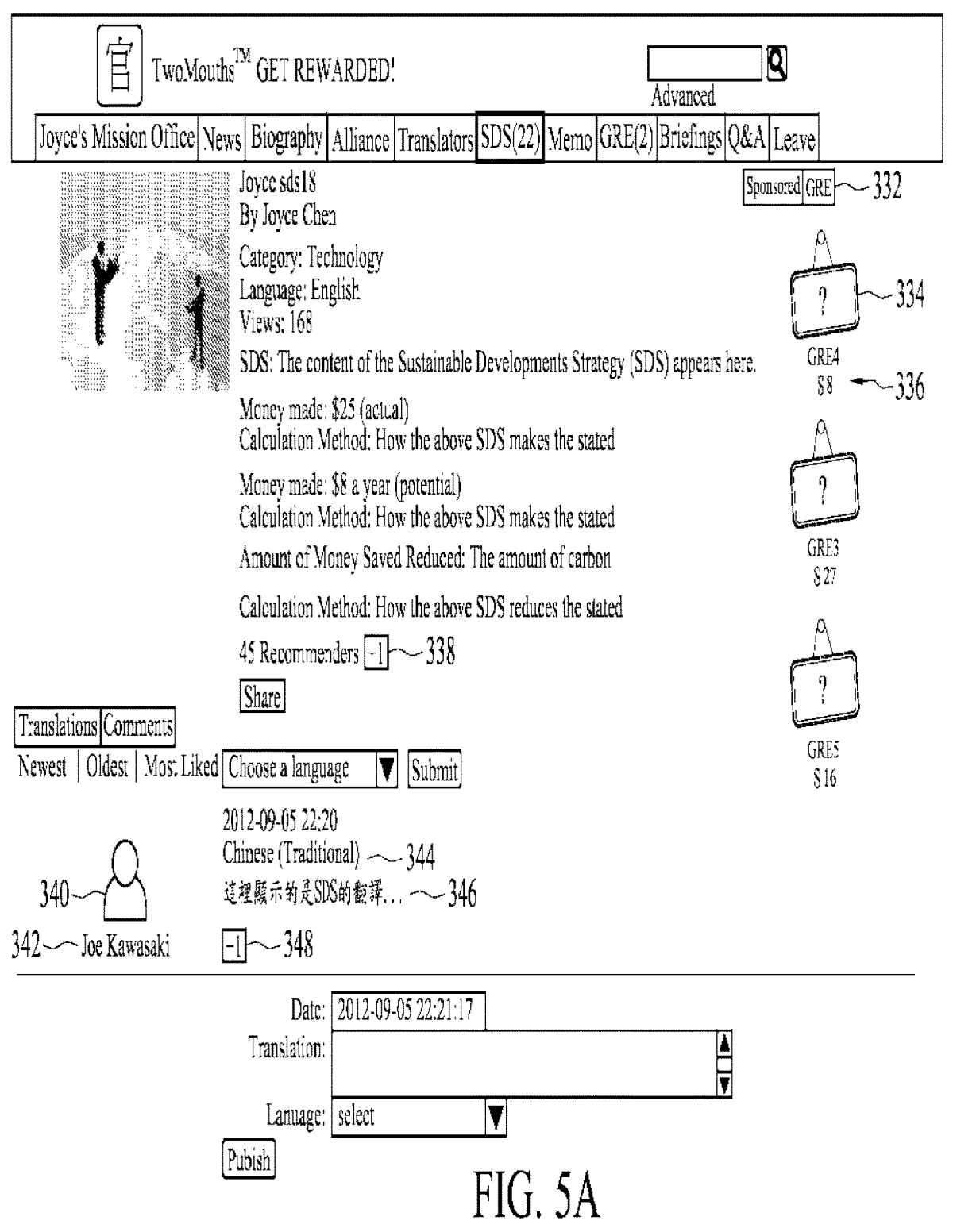
Figure 5B:
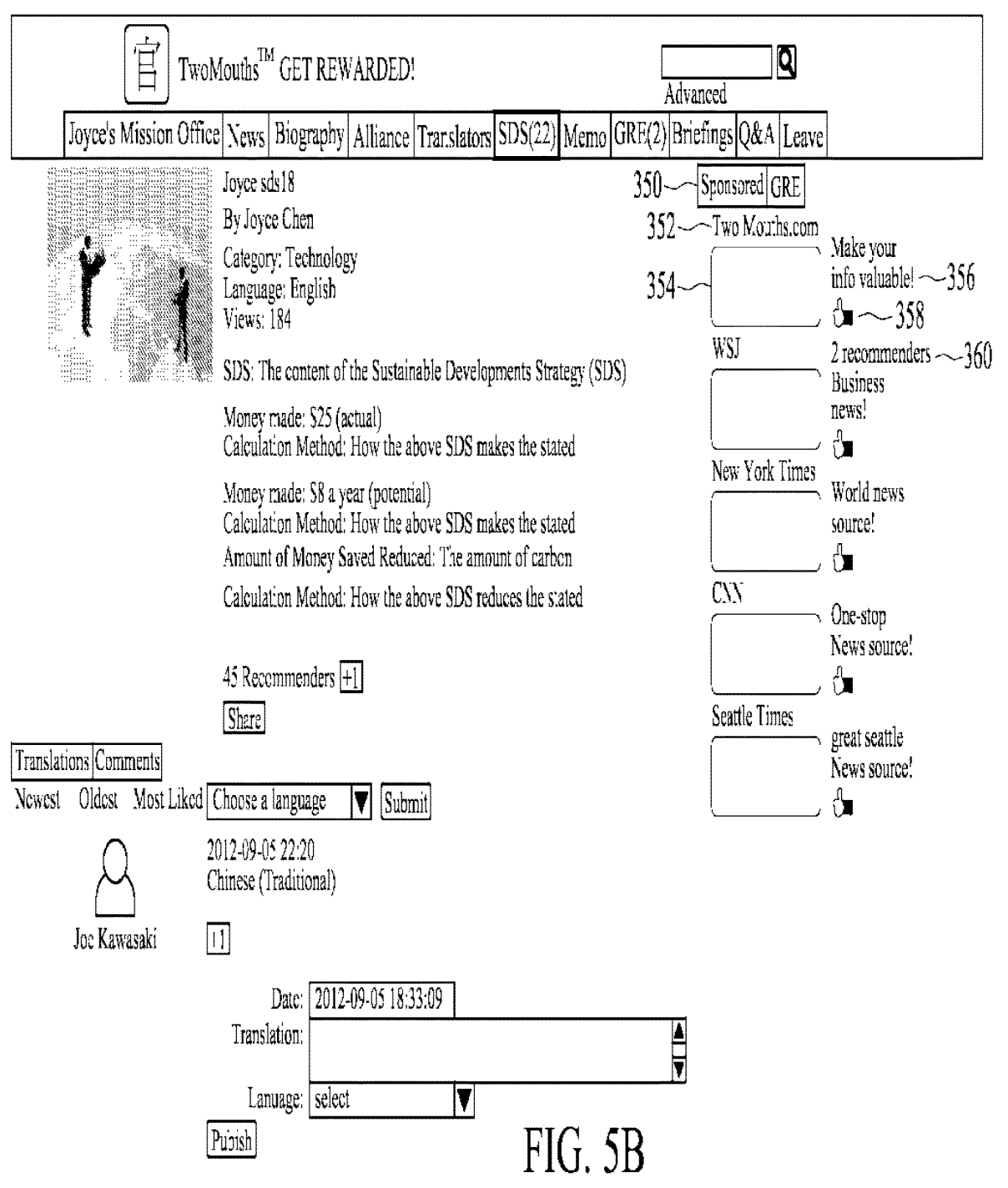

FIG. 3A is an exemplary screen showing how the SDS tab 88 illustrated in FIG. 2 may appear after a user gains more recommendations to publish more SDS. Referring to FIG. 3A, it shows a list of a user's published SDS. When a user clicks on a text link that appears below Title 126, it will direct a user to the details of an SDS, as shown in FIGS. 3C, 5A and 5B. Category 128 indicates the subject an SDS is related to. For example, if an SDS is about planting trees to reduce carbon, then it may be related to forests or atmosphere. Date 130 indicates the date and time an SDS is published.

FIG. 3B is an exemplary screen showing the information a user may supply in order to publish an SDS. Sustainable Development can be measured in many different ways, such as energy efficiency and reduction in carbon emissions. Different methods of measurement can result in a wide variety of green information. SDS content may be submitted to the processor 21 using an interface that allows for the submission of standardized data and content. In an embodiment, the format shown in FIG. 3B may standardize sustainable development strategy and green information reporting by asking users to share their SDS that take monetary terms into consideration. The specific standardized data/content may include:

(1) "Relevant image" 132. The image should be relevant to the contents of an SDS.

(2) "Title" 134. The title of the SDS should be entered in this box.

(3) "Category" 136. A user should choose a category his/her SDS is most relevant to. The categories include but are not limited to: Agriculture, Appliance, Architecture/Construction, Atmosphere, Biodiversity, Business/Finance, Chemistry, Economics, Education, Energy, Fashion, Food, Forests, Gardening, Health, Land, Machinery, Materials, Oceans/Seas/Coasts, Technology, Tourism, Transportation, Waste, Water and Other.

(4) "Your Sustainable Development Strategy (SDS)" 138. This is where a user should input his/her SDS. The system could limit the amount of text a user entered here, i.e., as shown in FIG. 3B, the SDS needs to be 500 characters or less. This is to encourage people to share their SDS in a succinct format. At the same time, potential readers can quickly grasp the author's SDS in a shorter period of time. However, the system can also be programmed so there is no restriction on the number of characters allowed or the system can be programmed so a different number of character restriction is imposed (5) "Amount of money your SDS could make" 140. Here, a user should input a dollar amount in US dollars. This number should indicate the amount of money one could actually or potentially make if the stated SDS were implemented. In addition, one may indicate the time it takes to acquire the reported amount of money. Namely, a user can choose the time length from "a day," "a week," "a month," and "a year." Alternatively, the system can be programmed so the dollar amount does not have to be in US dollars but in another currency such as yen or euros. The system can also provide a currency converter to help users to enter the amount of money with a type of currency he/she is most familiar with.

(6) "calculation method" 142. Here, a user should describe how he/she calculates the Amount of money your SDS could make 140 if one were to implement his/her SDS. The system could limit the amount of text a user entered here. This is to encourage the usage of clear and concise language to ease readability. However, the system can also be programmed so there is no restriction on the number of characters allowed.

(7) "Amount of money your SDS could save" 144. Here, a user is supposed to input a dollar amount in US dollars. This number should indicate the amount of money one could actually or potentially save if the stated SDS were implemented. In addition, one may indicate the time it takes to save the reported amount of money. Namely, a user can choose the time length from "a day," "a week," "a month," and "a year." Alternatively, the system can be programmed so the dollar amount does not have to be in US dollars but in another currency such as yen or euros. The system can also provide a currency converter to help users to enter the amount of money with a type of currency he/she is most familiar with.

(8) "calculation method" 146. Here, a user should describe how he/she calculates the Amount of money your SDS could save 144 if one were to implement his/her SDS. The system could limit the amount of text a user entered here. This is to encourage the usage of clear and concise language to ease readability. However, the system can also be programmed so there is no restriction on the number of characters allowed.

(9) "carbon emissions your SDS could reduce" 147. Here, a user should input an estimated amount of carbon emissions his/her SDS could reduce if it were implemented.

(10) "calculation method" 149. Here, a user should describe how he/she calculates the amount of carbon emissions his/her SDS could reduce if it were implemented.

(11) "language" 148. Here, a user should make a selection from a list by selecting the arrow to indicate which language he/she uses to draft the SDS, to provide a title for the SDS, to describe the "Amount of money your SDS could make," the "Amount of money your SDS could save" calculation methods and lastly the calculation method for "Carbon emission your SDS could reduce."

Using monetary terms, the above standardized data/content (5) to (8) may facilitate the evaluation of events or activities associated with a published content. For example, because carbon emissions are measured using different units/standards globally and such information is usually not exchanged easily or sometimes not accessible to the public, carbon trading among nations, manufactures, corporations and individuals as a result suffers from lack of information and confusion over such information even when available. With the format shown in FIG. 3B, a user is allowed to share carbon-trading and sustainable development related information in monetary terms. For example, a user's SDS could be regarding the amount of money he/she made by recycling a plurality of plastic/glass bottles or the amount of money he/she saved by walking instead of driving to work. It may be difficult for a user to calculate exactly the amount of carbon emissions he/she has reduced by recycling plastic bottles or walking instead of driving to work. However, using the format shown in FIG. 3B, a user can "quantify" his/her "green" information in monetary terms. Consequently, as compared to the conventional way of releasing/obtaining carbon-trading and sustainable development information by/from government official reports (which could be convoluted for the general audience), the method and system according to the present invention makes it possible for government institutes, corporations and individuals to share such "green" information in a unit (i.e., monetary terms) that is understandable and commonly used by most people, and in a standardized fashion. Furthermore, the format shown in FIG. 3B, allows a government institute to evaluate carbon-trading and sustainable development information in terms of money, to collect sustainable development-related information from its own citizens and from others around the world, and thus facilitates the government institute to formulate relevant policies on carbon-trading and sustainable development. Since one mission of this method and system is to help users around the world to understand that a Sustainable Development Strategy (SDS) does not have to be grand and complex, the concise and commonly-understandable format shown in FIG. 3B helps to strengthen this mission. When a government institute could study and collect many personal SDS from this method and system, government officials and researchers who are involved in drafting their national SDS and sustainable development reports can use the collected individual "green" information to create comprehensive national SDS and sustainable reports. After all, national Sustainable Development Strategies should be representative of its citizens' voices and opinions.

In an embodiment, the standardized data/content received by the processor 21 may be stored and managed in a database in the storage device 22. By selecting the "Publish" button 150, the processor 21 may retrieve the information a user entered from the storage device 22 and interface with the content publication module 23 to publish the user submitted content or data. It will be available for viewing for all registered members of the system. If the SDS is one of the top three newest, most viewed, most recommended and/or most translated, then it will be available for public viewing for registered as well as unregistered users.

Alternatively, the text limit for the SDS and the calculation methods for the amount of money made/saved can be increased/reduced or completely eliminated. Other alternatives for the "amount of money your SDS could make 140" and the "amount of money your SDS could save 144" fields are that users do not necessarily have to enter the amount of money in US dollars and can be a currency of a user's choosing. A currency selection list can be provided to help users to choose a currency he/she wishes to use to explain the amount of money an SDS makes or saves. A currency converter can also be presented to help users to covert the "amount of money your SDS could make" and/or the "amount of money your SDS could save" to a currency he/she desires to use. While not all of the information shown in FIG. 3B is required from users, this can change depending on how the system is programmed That is, the system can be programmed so that only some of the fields or all of the fields or none of the fields are required.

FIG. 3C is an exemplary screen showing how a published SDS may appear on the system after inputting the information as shown in FIG. 3B. Referring to FIG. 3C, if all the fields were entered/selected in FIG. 3B, then it will appear as shown in the text section 158.

By selecting 152 (the author of the SDS), a user will be directed to "Biography," as shown in FIG. 7A or 7B. In so doing, a user may further read about the author's background.

By selecting the "+1" button 160, a user may recommend the SDS. A user may recommend his/her own SDS and other's SDS only once. Because this screen shows when the SDS has not earned any recommendations, as a result, the author of this SDS has not earned any opportunities to sell any parcels of GRE. The message "None is for sale at the moment" shows this status. This message shows when a user clicks on the GRE tab 156. Again, GRE stands for Green Real Estate and refers to the empty space/slots that appear next to a user's SDS. This empty space is available for advertisements or other services such as sending greeting cards, depending on what the buyer's doing with the space. Because no GRE is available for sale, nothing will appear when a user clicks on the Sponsored tab 154 (no one could buy anything, so no one could upload anything).

A user of the system may help to translate the SDS by entering the translation of the shown SDS in a box 174 and select a language he/she uses to translate by making a selection in a selection list 176 and select publish 178 to transmit the information over the Internet. When several translations appear below the SDS, a user may select Newest 162, Oldest 164, Most Liked 166, to sort the list of translations. In addition, a user may also select a language in a selection list 168 and click the Submit button 170 to only view translations in a specific language. For example, if a user wishes to view only the translations in Italian, then he/she can select Italian in 168 and click the Submit button 170 to view only the Italian translations of the shown SDS.

Alternatively, the system can be programmed in such a way that the author may not recommend him/herself. For recommendations on other people's SDS, the system can be programmed so that a user may be able to recommend more than once if a certain threshold passes or a certain requirement fulfills. Instead of requiring a user to earn recommendations to sell GRE, the system can also be programmed so that he/she can sell GRE to make money without any recommendations. In other words, a user may potentially start selling his/her GRE as soon as he publishes an SDS and prices parcels of GRE to sell.

The system can also be programmed in such a way that it automatically prices the GRE for a user according to the number of viewers of the SDS, the number of recommendations of the SDS, the number of translations, and/or this particular user's pricing preferences (i.e., based on his/her pricing history). For sorting all the translations, besides newest, oldest, most liked and different languages, the translations can also be sorted by most recommended translations and/or the ranks of the users.

Figure 4B:
FIG. 4B is an exemplary screen showing how a user may access the available opportunities to price his/her GRE.
Figure 4D:
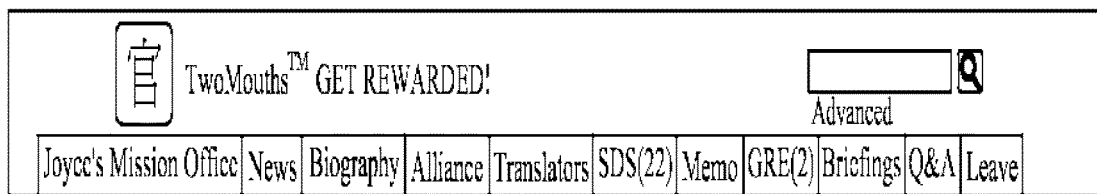
FIG. 4D is an exemplary screen showing the parcels of GRE a user is currently selling.
Figure 4G:
FIG. 4G is an exemplary screen showing the parcels of GRE a user has acquired via bidding.

FIG. 4A is an exemplary screen showing a main menu for managing a user's GRE. For every five recommendations a user has earned, he/she will gain an opportunity to sell a parcel of GRE. Referring to FIG. 4A, this screen shows when a user selects "Manage My Green Real Estate (GRE)" 120 after selecting the "Mission Office" tab 78, as shown in FIG. 2. When a user selects "Available opportunities to sell your GRE (price your GRE!)" 184, he/she will be directed to a page where he/she is able to set a base price for his/her GRE, as shown in FIG. 4B. Starting from the time the GRE's base price is set, it will go through two weeks of bidding. Other registered users of the system can place bids that are at least equal to or greater than the GRE's base price. A user can manage the GRE he/she is currently selling by selecting "GRE you are currently selling" 186. In so doing, a user will be directed to the exemplary screen as shown in FIG. 4D. At the end of the two-week bidding period if a user did not choose to end an auction early, whether a user's GRE is sold or not, a user may check the status (such as the highest bid amount or the highest bidder's name or that no one has placed any bids) by selecting "GRE you have sold and didn't sell" 188. Here, a user may also check the revenue he/she has earned from selling the GRE or whether someone has paid (a transaction ID is then provided) or not yet paid for the GRE he/she has acquired via bidding, as shown in FIG. 4E. On the other hand, when a user wishes to check the status of his/her bidding on other people's GRE, he/she can select "GRE you are bidding and your bidding history" 190. This link will take a user to find out whether he/she is/was the (current) highest bidder and other information such as the start and the end dates of the GRE auction, as shown in FIG. 4F. In order to ensure a user's privacy when he/she places bids on other users' GRE, he/she may choose a "bidding name" that he/she wishes to use for the GRE auction. To do so, a user would input a name in 182 and select the "change" button to make the change. To complete the purchase and the "construction" process of the GRE (i.e., uploading contents to a parcel of GRE he/she wishes to show), a user can select "GRE you have won via bidding (view payment status/upload your content here)" 192 to fulfill the requirements. The "construction" process refers to uploading contents to an "empty" parcel of GRE a user has acquired via bidding. This is shown in FIG. 4G. If a winning bidder did not pay the seller of the GRE in time or never completes the payment, then the seller may wish to block the bidder. There may be other reasons a seller may wish to block another user from placing bids on his/her GRE. The blocking action can be done by selecting "GRE you have sold and didn't sell" 188 and choose Block 258 in FIG. 4E. To unblock, a user should select "Blocked list" 194 in FIG. 4A and select Unblock 330 in FIG. 4J. To return to his/her "Mission Office," which is the main screen of the system as shown in FIG. 2, a user may select "Return to my Mission Office" 180.

Alternatively, a link called "Account Balance" that helps a user to manage his/her revenue from selling GRE can also be included in this menu. The time length of the GRE auction and the amount of revenue a user can earn by selling GRE can vary depending how the system is programmed and the traffic of the system (i.e., the number of GRE transactions and the number of users accessing the system etc.). For example, a parcel of GRE may not necessarily go through two weeks of bidding, it could be a day or a week or two months or there could be no time limit until the parcel of GRE is sold. The system can be programmed in such a way that it allows a user to select the time length he/she wishes to use for his/her GRE auction. In an embodiment, the system allows a user to collect 80% of his/her GRE's highest bid amount, but this profit share percentage can change. For example, the system could be programmed to allow a user to collect 90% if he/she passes a certain threshold or passes a certain requirement. The system can be programmed so that any amount of profit sharing is possible between a seller of the GRE and the system owner. The system can even be programmed so that the profit sharing can be split between the owner of the system, the seller of the GRE and the broker of the GRE. That is, if a user helps another user of the system to sell his/her GRE, the owner of the GRE can pay a certain amount of money to the user who helps him/her to sell it. FIG. 4B is an exemplary screen showing how a user may access the available opportunities to price his/her GRE. After selecting "Available opportunities to sell your GRE (price your GRE!)" 184 in FIG. 4A, a user will see the exemplary screen shown in FIG. 4B. By selecting one of the SDS/Memo title links in SDS/Memo title link section 196, a user will be directed to the SDS or the Memo where the parcel of GRE is advertised for sale. Further, when the parcel of GRE is sold, then this is also where the "newly constructed" GRE will appear. "Newly constructed" GRE means when a winning bidder pays for the highest amount he/she bided earlier and uploads content to the "empty" GRE (or the empty space/slot that appears next to an SDS/Memo). The title links in the link section 196 also take a user to where (or which SDS/Memo) he/she gains the recommendations from. Because of such recognition, a user gains opportunities (or an opportunity if there were only 5 recommendations) to sell GRE and make money.

By selecting one of the "price it now" links in GRE link section 198, a user will be directed to set a base price for his/her GRE, as shown in FIG. 4C. Instead of letting the system owner or the advertisers decide on the value of his/her uploaded information, a user may decide on the value of his/her published SDS/Memo (that could contain any types of content) and the blank space surrounding the published contents which are available for advertisement services or other uses (aka "GRE"). Bidders should place their bids at least equal to or greater than this base price amount. The start (date) 200 shows the first day and time that is available for a user to set a base price for his/her GRE. This is also the date and time when a user gains five recommendations on any of his/her published SDS/Memo. A user is required to price/her GRE by the end (date) 202 in order for his/her GRE to go through the GRE auction. In other words, this screen shows that a user has one week to set a base price for his/her GRE. If he/she does not meet this deadline, then the "price it now" link 198 will not be selectable. In other words, a user will lose his/her opportunity to sell the parcel of GRE he/she gained from earning five people's recommendations because he/she did not price the parcel of GRE in time.

Alternatively, the system can be programmed in such a way that it automatically prices GRE for a user based on his/her past pricing/selling history and/or number of viewers/recommenders of his/her published SDS/Memo and/or his/her pricing preferences and/or his/her number of translators/alliances etc. In addition, the system can be programmed so that there is no deadline to price GRE. In other words, as soon as a user gains a certain number of recommendations or as soon as a user publishes an SDS or Memo or any types of content, he/she will gain opportunities to set base prices for his/her parcels of GRE and he/she is not required to set the base prices by a certain date and time. A user may choose to set the base prices of GRE at any time without any deadlines.

FIG. 4C is an exemplary screen showing the information a user is requested to supply in order to price his/her GRE. This screen appears after a user selects "Price it now" 198 in FIG. 4B.

Referring to the exemplary screen FIG. 4C, item 204 shows not only the title of an SDS but also where the for-sale parcel of GRE appears. This is also where a user gains the recommendations from.

Item 206 shows the first day that is available for a user to price his/her parcel of GRE.

Item 208 shows the deadline for a user to price his/her parcel of GRE. A user can choose an image in the field box 212 to upload in order to advertise his/her GRE. This field can be required or optional. Once a user clicks on the "upload" button, he/she may preview the picture in the slot 210. For example, if a user were a company, he/she may choose to upload the company's logo. If a user wishes to upload his/her own artworks or pictures, he/she may do so as well. If a user chooses not to upload any images, then a default picture will appear (as shown).

Next, a user should input a dollar amount in the box 214 to set a base price for his/her parcel of GRE. Further, a user can provide a title for the parcel of GRE he/she is selling. This is to help both the sellers and the buyers to distinguish the different parcels of GRE he/she is selling/bidding.

Subsequently, a user may describe the parcel GRE he/she is selling in the box 218. The description 218 may be regarding how a user set his/her base price (such as based on the number of viewers and/or recommenders of his/her published SDS/Memo) or even regarding the artwork he/she uploaded. By pressing the "sell my GRE now" button 220, a user officially submits his/her parcel of GRE to go through the auction process. Otherwise, he/she may press "cancel" 222 to undo the pricing action.

Alternatively, the system can be programmed so that a user may choose how long the auction should be for his/her GRE. An auction time length selection function can be included here. Namely, a user may choose to allow a particular parcel of GRE to go through two days of bidding or even three months of bidding. A user may even choose not to set any time length for GRE auction and simply decide to end the auction at any time at his/her will.

Also, in an embodiment of the present system, a base price needs to be between $1 and $5,000 in whole dollar amount. However, the system can be programmed so that the base price can include decimals and any amount greater than 1 cent to infinity dollar of amount. The system can also be programmed so that a user may even have the option to give away the parcel of GRE for free at times. Another alternative is that a user may give away the parcel of GRE he/she gains from publishing recommended SDS/Memo/contents to another user of the system as a gift. The receiving user can either uses the parcel of GRE to upload contents him/herself or sell the parcel of GRE to yet another user.

Also, while the screen shows that a user should enter a dollar amount in US dollars, they system can be programmed in such a way that a user may enter any currency he/she desires, and the system can further provide a currency converter.

The system can also be programmed in such a way that only some of the fields in FIG. 4C or all of the fields in FIG. 4C are required.

FIG. 4D is an exemplary screen showing the parcels of GRE a user is currently selling. The screen appears after a user selects "GRE you are currently selling" 186 in FIG. 4A.

After entering the information to price his/her parcels of GRE (as shown in FIG. 4C), a user may observe the bidding process on his/her parcels of GRE here. This screen shows all the parcels of GRE a user is currently selling. The image a user uploaded in FIG. 4C will appear in the image section 224.

The title links under SDS/Memo 226 indicate where the for-sale parcels of GRE appear. Further, the title links under GRE 228 indicate the details of the for-sale parcels of GRE, as shown in FIG. 6B.

Base price 230 shows the base price a user has set in FIG. 4C. This is the least amount a bidder has to bid. However, the system can be programmed in such a way that, for example, if a parcel of GRE has not received any bids in a certain amount of time, then the first bidder of this parcel of GRE can even bid below the base price amount.

Highest bid 232 shows the current highest bid amount or the base price amount if no one has placed any bids on the parcel of GRE.

Bidder Name 234 shows the highest bidder's "bidding name." A user's "bidding name" is a name a user desires to use to place bids on other people's parcels of GRE. He/she may change his/her bidding name" in the box 182 in FIG. 4A. This may or may not be a user's actual name.

Start (date) 236 shows the start date and time of the GRE auction. The auction starts as soon as a user prices his/her parcels of GRE. Alternatively, the system can be programmed so that the auction does not start as soon as a user prices his/her parcels of GRE. Instead, the auction can start at any time of a user's choosing.

End (date) 238 shows the end date and time of the GRE auction. When the auction ends, whether the parcel of GRE is sold or not, the record of its transaction history will appear in "GRE you have sold and didn't sell," as shown in FIG. 4E.

End Bid 239 provides an option where a user may choose to end a GRE auction early. That is, a user may choose to not go through a week or a two-week bidding period and end the auction at a time when he/she sees a highest bid amount he/she is satisfied with.

Alternatively, the system can be programmed in such a way that it allows a user to set a price that it wishes to sell his/her parcel of GRE without any negotiations. That is, a user's parcel of GRE does not necessarily have to go through an auction process. A bidder (or a buyer) can simply purchases a user's GRE with a fixed price set by the seller of the GRE. In this case, neither the seller nor the buyer of the GRE needs to wait for a period of time for the auction to end. The seller can receive payments more quickly, and the buyer can "build on" his/her newly acquired GRE (that is, uploading content to the GRE) as soon as he/she completes the payment to both the seller of the GRE and the owner of the system. Again, the GRE auction time limit can vary depending on how the system is programmed. It can range from a few minutes to no time restrictions at all according to a user's preference.

FIG. 4E is an exemplary screen showing the transaction history of a user's sold (both paid and unpaid) and unsold parcels of GRE. The screen appears after a user selects "GRE you have sold and didn't sell" 188 in FIG. 4A. At the end of the auction, whether the parcel of GRE is sold or not, the record of its auction will appear here.

Images of the for-sale parcels of GRE appear in image section 240.

The title links under SDS/Memo 242 indicate the location of the GRE (i.e., at which SDS/Memo the parcel of GRE appears).

By selecting one of the GRE title links under GRE 244, a user will be directed to view the details of the for-sale parcel of GRE, as shown in FIG. 6B.

Base price 246 indicates the base price a user has set in FIG. 4C.

Highest Bid 248 indicates the highest bid amount on the parcel of GRE at the end of the auction. If there were no bids, then "none" will show.

Bidder Name 250 shows the highest bidder's actual name. By selecting a highest bidder's name, a seller may ask the highest bidder questions or send his/her comments/concerns. The conversation between the seller of the GRE and the buyer of the GRE is viewable to only both of them.

Start (date) 252 shows the start date and time of the auction, and End (date) 254 shows the end date and time of the auction.

Your revenue/Transaction ID 256 shows the amount of money a user has earned from selling the particular parcel of GRE and the Transaction ID associated this transaction. The amount of money shown is a percentage of the highest amount. For example, this screen shows that a user is earning 70 percent of the highest bid amount shown in Highest Bid 248. Again, the profit sharing scenarios can vary and range anywhere between zero and 100 percent between sellers of GRE and the system owner. Namely, the seller of GRE can collect no profits or 100 percent of the profits while the system owner could also collect no profits or 100 percent of the profits. As soon as the purchaser of the GRE completes payments, the seller of the GRE will obtain a Transaction ID to keep records (as shown in 256 in FIG. 4E).

Block 258 allows a user to block a bidder (also the buyer of the GRE). This means that the person who has been blocked will not be able to place bids on any of this user's future for-sale parcels of GRE. This may occur, for example, when the highest bidder of the parcel of GRE never completes payments.

Figure 4I:
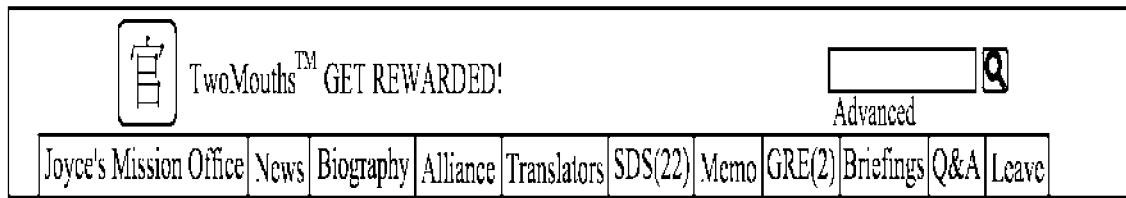
FIG. 4I is an exemplary screen showing how a user provides his/her sellers/buyers feedback.

Feedback 260 allows a user to provide feedback for his/her bidders (or buyers). The feedback may include text comments and/or numerical ratings (such as +1, 0, or −1), as shown in FIG. 4I.

While this screen shows that a user would gain 70% of the highest bid amount, the system can be programmed to include other profit sharing scenarios. For example, a user may gain 30% or 80% or even 100% at times if he/she passes a certain threshold or fulfills a certain requirement. If a user chooses not to go through auction to sell his/her GRE, then the Highest Bid 248 should show the amount of money paid by the buyer without any negotiations.

FIG. 4F is an exemplary screen showing the parcels of GRE a user is currently bidding. The exemplary screen appears after a user selects "GRE you are bidding and your bidding history" 190 in FIG. 4A. Here, a user may view the status of the parcels of GRE he/she is currently bidding (or trying to buy via auction) from other registered users of the system. Further, a user may view his/her previous bidding history here.

The images of the for-sale GRE are shown in image section 262.

The title links under GRE 264 direct a user to view the details of the GRE, as shown in FIG. 6B.

Seller name 266 shows the name of the GRE seller.

Base price 268 shows the "starting price" of the GRE. In other words, this is the base price the seller has set, and a bidder needs to set his/her bid at least equal to or greater than this amount.

Highest bid 270 shows either the current highest bid amount for the parcel of GRE a user is bidding or the winning/final bid price when the GRE auction ends.

Highest bidder 272 shows either the current highest bidder's "bidding name" during an auction or the winning bidder's "bidding name."

Start (date) 274 shows the start date and time of the GRE auction. End (date) 276 shows the end date and time of the GRE auction.

FIG. 4G is an exemplary screen showing the parcels of GRE a user has acquired via bidding. The exemplary screen appears after a user selects "GRE you have won via bidding (view payment status/upload your content here)" 192 shown in FIG. 4A. At the end of the auction, if a user has placed the highest bid on a parcel of GRE, then he/she becomes the "winning bidder." The details of the GRE a user has acquired via bidding appear in FIG. 4G.

Images of the acquired GRE appear in image section 278.

The GRE title links under GRE 280 direct a user to view the details of the GRE, as shown in FIG. 6B.

When selecting one of the user's name links under Seller Name 282, a user may ask his/her seller questions or send comments/concerns. This conversation is viewable only to the seller and the buyer of the GRE.

Base price 284 shows the "starting price" the seller of the GRE originally set for his/her properties.

Highest bid 286 shows the winning (highest) bid amount on the GRE. This is also the amount of money a user pays at the end of the auction if he/she were the winning bidder.

Bidding start (date) 288 shows the starting date and time of the auction. Bidding end (date) 290 shows the end date and time of the auction.

At the end of the auction, a user should select "Pay Now" 300 to complete the payment process. The payment method includes but is not limited to credit cards (Visa/Master/Discover/American Express, JCB), checks and PayPal. If a user chooses to use PayPal, he/she may receive the money he/she could collect (i.e., a percentage of the highest bid amount, such as 70% of the highest bid amount) instantly by using services such as PayPal Adaptive Payments. Such service will split the money automatically between the seller of the GRE and the owner of the system after a highest bidder completes his/her payment. For example, if a user were to pay $100 for a parcel of GRE he/she acquired via auction, by using services such as PayPal's Adaptive Payments, PayPal will automatically send $70 to the GRE seller's PayPal account and $30 to the owner of the system's PayPal account as soon as a purchaser of the GRE pays by credit card or sends money from his/her PayPal account. In this way, contrary to the traditional method where a user may have to wait until his/her profits reach a certain threshold to collect his/her earnings (i.e., waiting until the profit gains to reach $100 to receive a check in the mail, which is often the case for users who use services such as Google AdSense), this method allows a user to collect money right away. Once this step is complete, the Pay now link 300 will disappear, the Paid Date 292 will appear, and finally, a user will see a link named Upload Available Now 298 appears. When a user selects this link, he/she will see the exemplary screen as shown in FIG. 4H. This is where a user may upload the content he/she desires to advertise/show. After a user finishes uploading his/her desired content to show, Upload Available Now 298 will disappear and the Feedback 294 and Uploaded 296 links will appear.

By selecting Feedback 294, a user may provide his/her seller feedback/rating, as shown in FIG. 4I. The feedback may include text comments and/or numerical rating (such as +1, 0 or −1). When a user selects Uploaded 296, he/she will be directed to the SDS or the Memo (which could contain any types of contents) where the "newly constructed" (aka content uploaded) GRE will appear. The date and time that a purchaser of the GRE chooses to upload content will appear in Show Start 293. This date and time also indicate the starting date and time the content-uploaded GRE will start to appear at the selected SDS or Memo. Show End 295, as shown in FIG. 4G, indicates the ending date and time the content-uploaded GRE will disappear at the selected SDS or Memo (where the purchaser bids the "empty" GRE slot from). TM transaction ID/Seller Transaction ID 297 provides two transaction IDs associated with a particular GRE transaction once the purchaser (bidder) of the GRE completes payments for record-keeping purposes. "+1" 299 indicates how many times a viewer of a content-uploaded GRE has clicked on the "thumbs-up" button 358, as shown in FIG. 5B.

Alternatively, the system can be programmed so that the "newly constructed" (content uploaded) GRE can appear at any time length. For example, it may appear for a week or more or less. The time length could range anywhere between a second to an infinite amount of time. When a user selects "Pay Now" 300, he/she can either pay for the auction-acquired GRE via the System or the link may direct a user to an external website (such as PayPal) to complete the payment process.

The system can be programmed in such a way that a purchaser of a parcel of GRE may be required to upload contents to his/her empty space (aka GRE) by a certain date and time. On the other end, the system can also be programmed so there is no expiration date as to when a user needs to upload the contents he/she desires to show/advertise in the parcel of GRE he/she acquired via the auction.

FIG. 4H is an exemplary screen showing the information a user may be required to supply in order to "construct" his/her GRE (or to upload content to his/her GRE). That is, when a user has won a parcel of GRE via auction (by placing the highest bid by the end date of the auction in one embodiment), he/she has then gained an "empty space" next to an SDS or a Memo (that could contain any types of content) that is available for advertisements or other similar services or other uses such as sending greeting cards. By paying for the GRE he/she has acquired via auction, a user becomes the new owner of the GRE for a period of time. He/she may utilize the "empty space" (aka Green Real Estate (GRE)) any way he/she desires as long as it is legal, appropriate and obeys the system's content guidelines.

First, a user may choose an image to upload to his empty GRE in the box 304. He/she can then preview the image he/she uploaded in the slot 302. It may be an image of his/her company's logo and/or an image relevant to the content/link he/she wishes to show/advertise. It may also be an image of a greeting card if he/she wishes to utilize the space as a medium to send wishes/greetings or to express feelings (such as a thank-you note or to even send a marriage proposal). For example, if the highest bidder of the GRE (aka the purchaser of the GRE) were friends with the author of the SDS, and he/she wishes to send him/her (author of the SDS) birthday wishes, then the purchaser may wish to upload a happy-birthday greeting card image here. In so doing, not only is the purchaser of the GRE sending the author of the SDS birthday greetings, he/she is also sending his/her friend, who is the author of the SDS, a certain amount of money to celebrate his/her birthday.

Next, the purchaser of the GRE should enter a title of the content he/she wishes to show/advertise in a box 306. A description of the content the GRE purchaser wishes to show/advertise should be entered in a box 308. The purchaser should provide an URL link that is relevant to the content he/she wishes to show/advertise in a box 310. This will take a user to an external website or could be a link in general that either links within the system or outside of the system. For example, if the purchaser of the GRE wishes to advertise his/her company, then he/she may enter his/her company website's URL here.

Subsequently, by selecting the Submit 312 button, all the information entered will be transmitted over the Internet to appear next to the SDS or the Memo. An example of how this would appear is shown in FIG. 5B.

Alternatively, if the purchaser of the GRE wishes to use the image the seller of the GRE uploaded for advertising it for the auction (i.e., the image the seller of the GRE uploaded in FIG. 4C), then the system can be programmed so that a purchaser of the GRE may keep the seller's previously uploaded image. For example, if a seller of the GRE also happens to be an artist and/or a graphic designer and/or a photographer, then he/she may wish not only to sell the empty space (aka "GRE") next to his/her SDS/Memo, but also his/her artworks/photos by uploading them in FIG. 4C. In so doing, the seller may possibly set a base price of a parcel of GRE higher since he/she is also selling an image or a photo or a piece of artwork he/she designed. At the same time, the purchaser of the GRE not only has acquired a parcel of "empty" online real estate to use in any ways he/she desires (as long as it is legal, appropriate and obeys the system's rules), he/she has also purchased a piece of artwork he/she can later use. The system can be programmed in such a way that the purchaser may choose to use the acquire piece of artwork/photo instantly or for later use for other parcels of GRE. Alternatively, the seller of the GRE may also choose to sell the rights of the image/photo for only a specific period of time. That is, the final purchaser of the GRE may only use the image/photo/artwork for only a few hours or a few days or a few years (the time length could vary depending on how the system is programmed).

FIG. 4I is an exemplary screen showing how a user provides his/her sellers/buyers feedback. The screen appears when a user selects Feedback 260 in FIG. 4E and Feedback 294 in FIG. 4G. This is the exemplary screen a user may see when he/she wishes to provide feedback for his/her sellers/buyers of his/her GRE parcels.

A user can provide text comments/concerns for his/her sellers/buyers in the box 314. In addition, a user could provide his/her sellers/buyers numerical ratings in the rating section 316, such as +1, 0 or −1. A user can base this rating on his/her transaction experience with his/her buyer/seller. For example, if the purchaser of the GRE (aka the winning bidder of the GRE) quickly completes the payment, so the seller can collect the money sooner, then the seller may wish to provide his/her buyer a +1 rating for his/her efficiency. Subsequently, when a user selects the Submit my rating button 318, all the entered information will be transmitted over the Internet.

Alternatively, the system can be programmed in such a way that the ratings do not necessarily need to be represented by numbers (+1, 0, −1); instead, the ratings can be represented by images such as thumbs-up or down or the number of stars or any other representative images. In addition, the system can be programmed so that the ratings can help a user to increase his/her ranking (as shown by the numerical badge in FIG. 2's 112 and FIG. 7A's item 406). By providing candid ratings, a user can help potential GRE bidders/sellers to understand other users' GRE transaction history.

The system can be programmed so that only the first numerical rating will count, or all of the subsequent numerical ratings will count as well. In addition, the system can be programmed so that if a user has consistently earned positive ratings, the he/she can gain a higher profit share or sell more parcels of GRE. On the other hand, if a user has consistently received negative ratings, the system can also be programmed so that user may have to earn lower profits when selling GRE or sell less parcels of GRE.

Figure 4J:
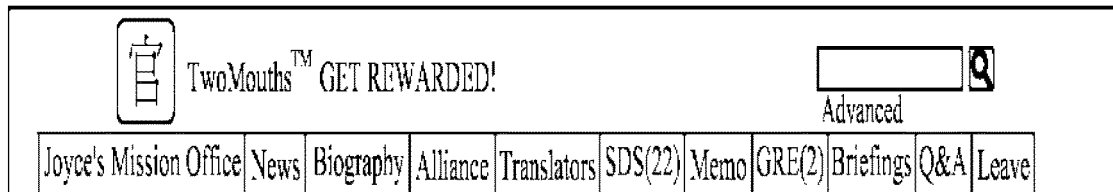
FIG. 4J is an exemplary screen showing a list of people a user has blocked from bidding his/her GRE.

FIG. 4J is an exemplary screen showing a list of people a user has blocked. The exemplary screen appears when a user selects Blocked list 194 in FIG. 4A. Here, a user may access the system in order to view a list of people he/she has blocked from placing bids on his/her GRE. A user may also unblock people he/she previously blocked here.

Also referring to FIG. 4E, a user may choose to block another user from placing bids on his/her GRE by selecting Block 258. This means that whoever that has been blocked cannot place any more bids on the blocker's GRE. This may occur when a seller finds that a bidder/purchaser of the GRE did not complete payments, or did not pay in time and/or have uploaded inappropriate content to the empty parcels of GRE in the past.

A user may view the blocked person's image in image section 320. The blocked person's name shows under Name 322. The blocked person's overall GRE buying/selling feedback rating shows under GRE Transaction Rating 324. The blocked person's total number of recommendations (gained from the SDS and/or Memo and/or briefings and/or translations he/she have published) shows under Total Recommendations 326. The date and time this blocking action occurs appears in Date Blocked 328. If a user chooses to unblock a person, he/she may simply select Unblock 330 to do so.

FIG. 5A is an exemplary screen showing a published SDS that has earned recommendations. A user may see this exemplary screen after he/she prices his/her GRE in FIG. 4C. When a user of the system visits another user's "Mission Office," he/she may also select the SDS tab and one of the title links to view this screen (as shown in FIG. 3A). When a viewer of an SDS selects the GRE tab 332 in FIG. 5A, he/she will see the current for-sale GRE and the for-sale GRE's current highest bids. The image a seller of the GRE (also the author of the SDS) uploaded in FIG. 4C will appear in a slot 334 here in FIG. 5A.

The dollar amount in a price link 336 shows the current highest bid of the GRE. By selecting the dollar amount in the price link 336, a user will be directed to see the exemplary screen shown in FIG. 6B to view the details of the current for-sale GRE, which may include the start/end date of the auction, the bidding history, the number of current bids, the base price of the GRE etc.

By selecting the "+1" button 160 in FIG. 3C, a user can recommend an SDS that he/she finds effective and beneficial.

When an SDS has gained several recommendations, it will appear as shown in a link 338 in FIG. 5A. After a user has recommended an SDS once by selecting the "+1" button 160 in FIG. 3C, the "+1" button 160 will disappear. The number of recommenders link 338 in 5A shows the current total number of recommenders, and by selecting it, a user may view a list of the recommenders of the published SDS. When a viewer of the SDS decides to offer a translation of the SDS, he/she may enter his/her translation in 174 in FIG. 3C and select a language he/she uses to translate in 176 in FIG. 3C, then the translation of the SDS will appear at section 346 and the language used to translate will appear at 344, in FIG. 5A.

A user, including the translator him/herself, may recommend the translation by selecting the "+1" button 348 in FIG. 5A. The translator's picture will show in an image link 340 and his/her name will appear in a name link 342. When a user selects this name link 342, he/she will be directed to view this translator's profile, as shown in FIG. 7A.

Alternatively, if a user wishes to sell his/her GRE for a fixed price instead of going through a bidding process, then the price shown in price link 336 will be the fixed-price a buyer would pay to become the new owner of the empty GRE for a period of time. A seller of a parcel of GRE can also choose to not only sell the empty space next to his/her published SDS/Memo/other contents but also the images/ photos/artworks he/she uploaded in FIG. 4C. The new owner of the GRE may own the image for a period of time or forever, depending on how the seller of the GRE sold his/her GRE.

FIG. 5B is an exemplary screen showing a published SDS when payments on the acquired GRE have been completed and contents have been uploaded to the empty GRE slots. By selecting the Uploaded link 296 in FIG. 4G, the purchaser of the GRE (aka the new owner of the GRE for a period of time) may view how the contents he/she uploaded appear next to an SDS/Memo. In general, when a user of the system views an SDS, by selecting the Sponsored tab 350, he/she may view all the contents GRE purchasers have uploaded.

Item 352 shows the title the purchaser of the GRE entered in FIG. 4H's 306. By selecting it, a user will be directed to an external website via an URL that a purchaser of the GRE entered in FIG. 4H's 310. A user may also provide a link that takes a viewer of the content-uploaded GRE within the system.

Item 354 shows the image the purchaser of the GRE uploaded in FIG. 4H's 304.

Item 356 shows the descriptions the purchaser of the GRE entered in FIG. 4H's 308.

At any time, when a user of the system wishes to recommend a "Sponsored" GRE (or GRE that has been filled with contents), he/she may select the "thumbs-up" image 358.

Item 360 shows the current number of recommenders on the sponsored GRE. All the sponsored GRE may appear randomly. In one embodiment, the system is programmed in such a way that the layout only allows five sponsored GRE (such as the one shown in FIG. 5B), then a user may select a link (not shown) to view the rest of the sponsored GRE.

Alternatively, the system can be programmed so that the sponsored GRE and/or the for-sale GRE do not appear randomly. That is, the positions of the GRE are fixed. In this way, the seller of the GRE may wish to sell higher-positioned GRE parcels for higher prices and lower-positioned GRE parcels for lower prices if he/she desires. Alternatively, the system can also be programmed so the sponsored GRE (aka contents-filled GRE) appear at a specific pattern, such that the higher priced GRE will tend to appear at the top or higher-ranked GRE buyers' GRE will tend to appear at the top etc.

In addition, the system can be programmed so that even when the purchaser of the GRE no longer owns this parcel of online real estate, he/she may still keep the image he/she paid for while acquiring the empty GRE parcel and use it elsewhere. For example, if the seller of the GRE sold both the empty space and his/her design of a Christmas card, the winning bidder not only has acquired a parcel of GRE for any uses he/she desires but also the image of a holiday greeting card that he/she may use it again to send holiday greetings to another person. As the creator of the holiday greeting card image, the seller of the GRE can certainly sell the image again, but he/she may also choose to sell the right to use the image completely once a purchaser of the GRE makes full payments. This depends on how the seller of the GRE sold his/her GRE.

Furthermore, the system can also be programmed so that not just the highest bidder gains rights to use the empty GRE for a period of time. For example, the system can be programmed so the highest three bidders of a parcel of GRE all acquire rights to utilize the empty GRE parcel. The positions of their contents-uploaded GRE will then depend on their bid amounts. That is, the higher his/her bid amount, the higher position his/her contents-uploaded GRE is.

Figure 6A:
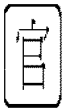
FIG. 6A is an exemplary screen showing a list of a user's for-sale GRE.

FIG. 6A is an exemplary screen showing a list of a user's for-sale GRE parcels. A user may access the system in order to view another user's (or his/her own) for-sale GRE parcels. When a user arrives another user's "Mission Office", he/she may select the GRE tab 90 in FIG. 2 to reach the exemplary screen shown in FIG. 6A.

Images of the GRE are shown in image section 364.

The SDS/Memo title links under SDS/Memo 366 direct users to view where the for-sale GRE parcels appear, as shown in FIG. 5A.

The for-sale GRE name links under GRE 368 direct users to view the details of the for-sale GRE parcels, as shown in FIG. 6B.

The Base Price 370 shows the starting bid prices the sellers of the GRE parcels have set for the auction. Highest Bid 372 shows the current highest bids on the GRE. Start (date) 374 shows the starting date and time of the GRE auction. End (date) 376 shows the ending date and time of the GRE auction. The number of views and the number of bids (not labeled) for each GRE parcel are also shown to provide more information to users.

FIG. 6B is an exemplary screen showing the details of the for-sale GRE parcels illustrated in FIG. 6A. Referring to FIG. 6B, a user may further learn about the details of the for-sale GRE parcel by selecting the title links of the GRE 368 in FIG. 6A. Here, a user may learn about the seller of the GRE's overall transaction rating by selecting [a user's first name]'s Green Real Estate (GRE) Transaction Rating 378. When a user finishes viewing the details of a for-sale GRE parcel, he/she may view other for-sale GRE parcels by selecting [a user's first name]'s other Green Real Estate (GRE) for Sale 380 for a complete list of the GRE parcels that are for sale.

Item 382 shows the name of the for-sale GRE parcel.

Item 384 shows the title of the SDS or the Memo (which could contain any types of contents), and also the location of the for-sale GRE parcel. By selecting the title link of the SDS/Memo 384, a user will be directed to the SDS/Memo where the for-sale GRE parcel appears, as shown in FIG. 5A. At the same time, this is also where the content-uploaded GRE will appear when a highest bidder/GRE purchaser uploads the content he/she desires to show after payment, as shown in FIG. 5B.

Start (date) 386 shows the starting date and time of the GRE auction. End (date) 388 shows the ending date and time of the GRE auction. The Base Price 390 shows the starting bid price the seller of the GRE has set for his/her "properties" in FIG. 4C. The description 392 shows the description of the for-sale GRE parcel a seller wishes to make available for interested bidders. This may or may not include how he/she set the base price (based on the number of viewers/ recommenders of the published SDS/Memo/other contents) or whether he/she not only is selling the "empty space" but also the artwork he/she uploaded. Such artwork or any image the seller of the GRE uploaded in FIG. 4C appears in FIG. 6B's 396.

The total number of bids that have been placed so far on the GRE is calculated in Bids 394. The bidder names that appear under Bidder 398 show bidders' "bidding names". A bidder may change his/her "bidding name" in FIG. 4A's 182. By not showing a bidder's real name during the auction, this ensures the protection of a user's privacy. Alternatively, the system can also be programmed so that a user's actual name shows.

The dollar amounts that appear under Bid Amount 400 indicate each bidder's bid dollar amount on this particular parcel of GRE. When a user is viewing another user's for-sale GRE parcels instead of his/her own, this screen will include a text box where a bidder may input a dollar amount to place a bid, such as shown in Bidding Price 395 in FIG. 6B. Bid Date and Time 402 indicates the date and time a bidder places the bid. When a user who has been blocked by the seller of the GRE, he/she will not be able to place bids on the GRE, and thus he/she will not see Bidding Price box 395.

FIG. 7A is an exemplary screen showing a user's biography. Referring to FIG. 7A, a user may access the system in order to view his/her own biography by selecting the Biography tab 82 illustrated in FIG. 2.

To upload a picture that verifies identity, a user may select "upload my picture" 408 to do so. The uploaded picture will appear in item 404.

To edit his/her own "biography," a user may select "edit biography" 410 to do so. The information entered after selecting Edit Biography 410 will appear in item 414.

To change his/her password to log in the system, a user may select "change password" 412 to do so.

The number badge 406 indicates a user's current rank. The rank may be based on the total number of recommendations a user has gained from his shared SDS, transactions and briefings etc. The system can be programmed in such a way that a user's rank can be based on other recommendations/ratings, such as his/her GRE transaction ratings or his/her Memo recommendations or other published contents' recommendations. Further, the system can be programmed so that a "higher-ranked" user may sell more GRE parcels or earn a higher profit when selling his/her GRE or draft more SDS or publish more contents if there are restrictions.

FIG. 7B is an exemplary screen showing how a user may access the system in order to view another user's biography. This screen is similar to that illustrated in FIG. 7A except that when viewing another user's biography, one will not have the ability to edit that person's biography. That is, one can only edit his/her own biography. After arriving at another user's "Mission Office," by selecting the Biography tab 82 illustrated in FIG. 2, a user may view another person's biography. In so doing, one can further understand the SDS/Memo/translations/briefings/contents publishers' points of view and their background. After reading another user's SDS/Memo and/or Biography, a user may wish to invite him/her to become his/her alliance. To do so, a user can select "Add as alliance" 416. A user may also invite another user to become his/her translator by selecting "Add as translator" 418.

FIG. 7C is an exemplary screen showing how a user may access the system in order to view another user's or his/her own list of alliance. This screen appears after a user selects the Alliance 84 tab illustrated in FIG. 2.

FIG. 7D is an exemplary screen showing how a user may access the system in order to view another user's or his/her own list of translators. This screen appears after a user selects the Translators 86 tab illustrated in FIG. 2.

FIG. 8A is an exemplary screen showing how a user may access the system in order to view another user's or his/her own list of published briefings. This screen appears after a user selects the Briefings 92 tab illustrated in FIG. 2. Because the mission of system is to allow users to become "government officials" or representatives of their countries (such as ambassadors/diplomats), users can publish "briefings" they desire to share with the public via the system. The types of briefings that can be published via the system include but are not limited to photo briefing (as shown by example 420), video briefing (as shown by example 422), press releases briefing (as shown by example 424) and link briefing (as shown by example 426). Users also have the option to recommend another's briefings or even his/her own briefings. When a user views his/her own briefings, he/she will see a "Publish a briefing" link as shown in FIG. 8A (not numbered). He/she can then select that link and follow the steps shown in FIGS. 8B to 8E to publish the described four types of briefings. Again, the system can be programmed so other types of briefings can be published. For example, an audio type of briefing where a user may share voice recording.

FIG. 8B is an exemplary screen showing how a user may access the system in order to publish a "Links" type of briefing. A user would first enter a title of his/her link briefing in a box 428, then a description of his/her link in a box 430 and subsequently the URL of his/her link in a box 432. All the information entered will be transmitted over the Internet and the published "links" type of briefing will appear as FIG. 8A's item 426.

Figure 8C:
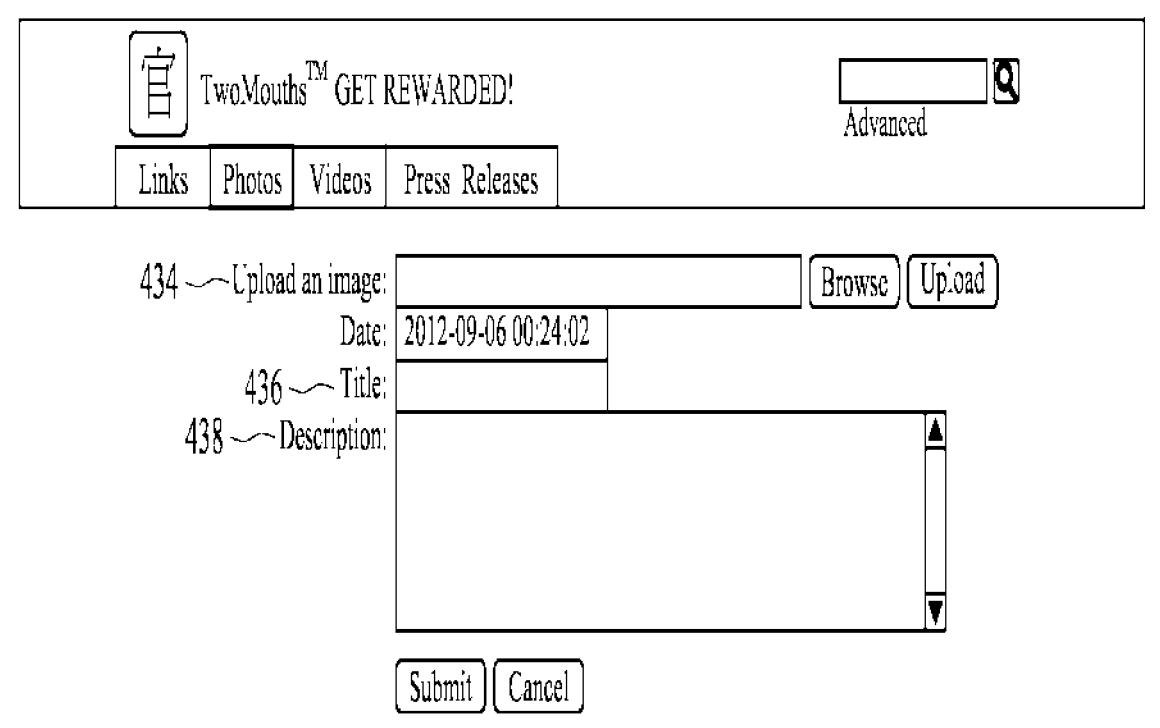

FIG. 8C is an exemplary screen showing how a user may access the system in order to publish a "Photos" type of briefing. A user can first upload a photo or an image by selecting its file path in a selection list 434. Next, a user can input a title of his/her photo/image in a box 436. Subsequently, a user can describe his/her photo/image in a box 438. All the entered information will be transmitted over the Internet and the published "photos" type of briefing will appear as FIG. 8A's item 420. The system can be programmed so that any number of images (ranging from one to infinity) can be uploaded.

Figure 8D:
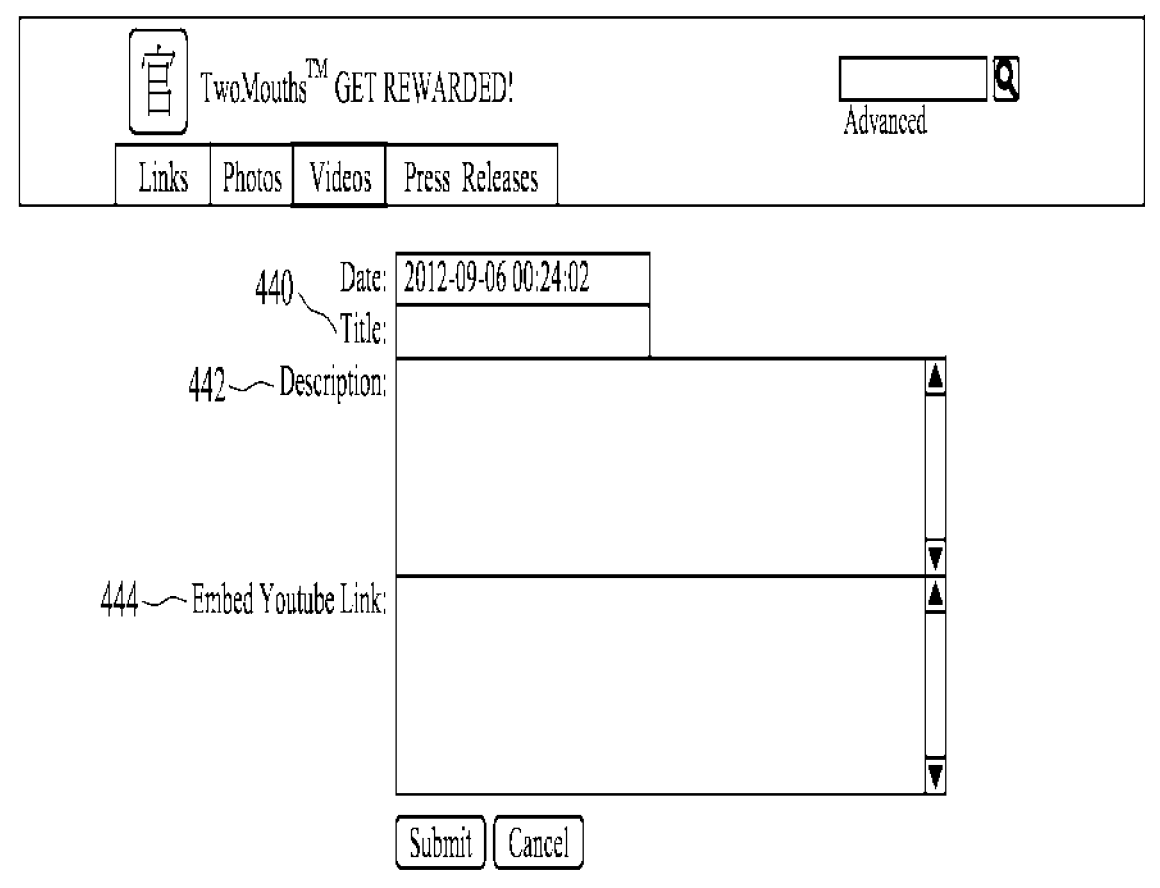

FIG. 8D is an exemplary screen showing how a user may access the system in order to publish a "Videos" type of briefing. A user would first enter a title of his/her video in a box 440. Then he/she can input a description of his/her video in a box 442. Subsequently, a user can then embed a video link in a box 444. All the entered information will be transmitted over the Internet and the published "videos" type of briefing will appear as FIG. 8A's item 422.

Figure 8E:
FIG. 8E is and exemplary screen showing how a user may access the system in order to publish a "Press Releases" type of briefing.

FIG. 8E is and exemplary screen showing how a user may access the system in order to publish a "Press Releases" type of briefing. A user would first enter a title of his/her Press Release in a box 446. Then the user can enter his/her statement (i.e., the contents of his/her Press Release) in a box 448. All the entered information will be transmitted over the Internet and the published "Press Releases" type of briefing will appear as FIG. 8A's item 424.

Figure 9:
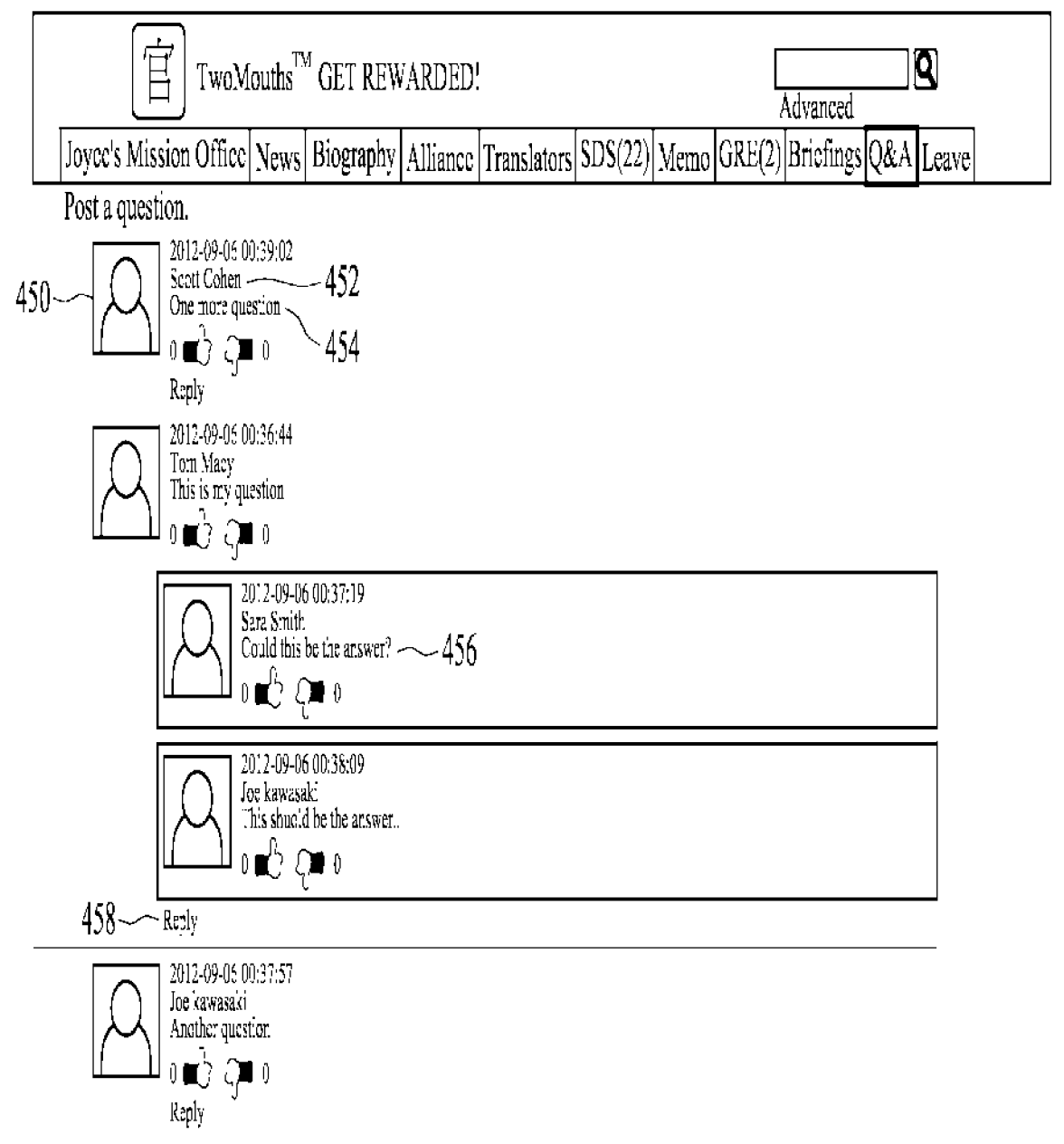

FIG. 9 is an exemplary screen showing how a user may access the system in order to participate in Q&A sessions. In order to foster closer interaction among members of the system and to provide a platform where users can ask/respond to questions efficiently and improve each other's SDS overall, this system also provides users opportunities to participate in Q&A sessions. To do so, after a user logs in the system, he/she can select the Q&A tab 94 in FIG. 2. When arriving at his/her own "Mission Office," he/she can view the most recently posted three questions for him/her, as shown in FIG. 2's item 114.

To view all the records of Q&A, he/she can select the Q&A tab 94 in FIG. 2. When arriving at another user's "Mission Office, by selecting the Q&A tab 94 in FIG. 2, a user can view another user's Q&A and participate in it if he/she desires.

To ask a question, a user would input his/her question(s) in a text box, and the submitted question will appear as item 454 and his/her profile picture (the person who asked the question) will appear in item 450 and his/her name will appear in item 452.

In order to respond to any questions, a user may select the Reply link 458 and a text field will appear (not shown) for a user to input his/her response. The submitted response will appear as shown in item 456.

FIG. 10 is an exemplary screen showing how a user may access the system in order to view updates of his/her alliance. This screen shows after a user selects the News tab 80 illustrated in FIG. 2. The mission of the system is to foster closer interaction among members of the system by updating users of his/her alliance's recent activities. The types of updates include but are not limited to new-briefings, new-translations, new-SDS/Memo and new-GRE parcels-for-sale updates. That is, when a user's alliance has published a briefing (which may include links, photos, videos and/or press releases), added a translation or published an SDS/Memo or other contents or has just listed a parcel of GRE for sale, a user will be notified with such updates. For example, as shown in FIG. 10, when a user's alliance has just listed a parcel of GRE for sale, the user's News tab 80 will be added with a link named "[user's first name] is now selling a parcel of Green Real Estate titled '[GRE's title name]' on [date]" 470. The alliance's picture will be shown in item 468. Another example is that when a new SDS has been published, the update will appear as shown in FIG. 10's item 472. Subsequently, when a user's alliance has added a translation, the update will appear as shown in FIG. 10's item 474. By selecting these alliance "update" links, a user will be directed to view the newly published briefing, translations, for-sale GRE parcels and/or SDS/Memos.

Alternatively, the News tab 80 can also include updates of a user's translators and/or the sustainable development news articles a user has subscribed. As mentioned above, News 80 can also update a user on the latest news of sustainable development in general, for example, the policy changes regarding the carbon trading rules. Moreover, News 80 can also allow users to subscribe and obtain corporations/organizations/schools/products' latest updates and "green" product releases. Finally, News 80 can also include local, national and world news in general, providing users quick access to the latest information.

Figure 11A:
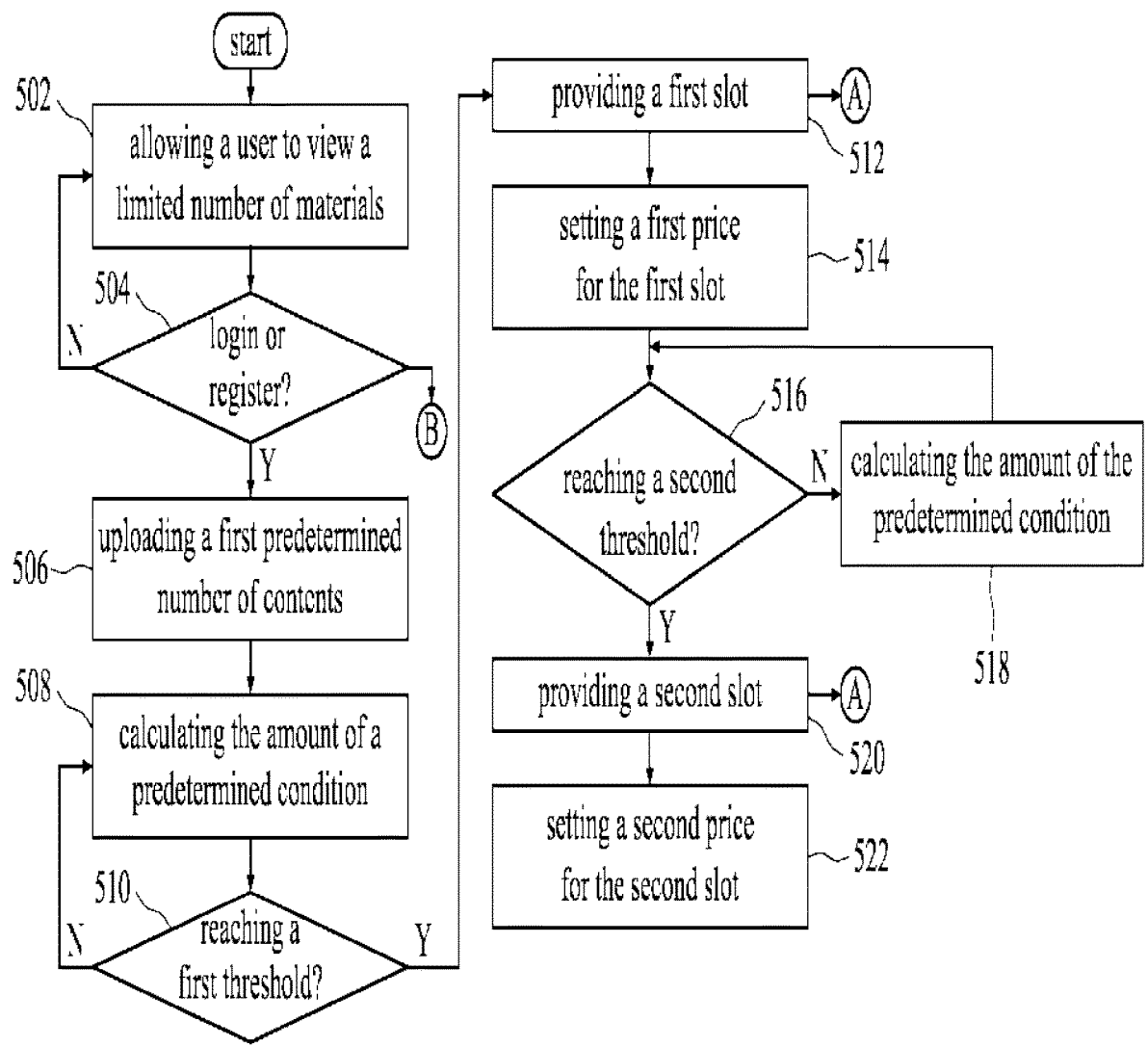
FIGS. 11A to 11C are flow diagrams showing a method for integration among content publication, advertisement services and rewards collection in accordance with an embodiment of the present invention.
Figure 11B:
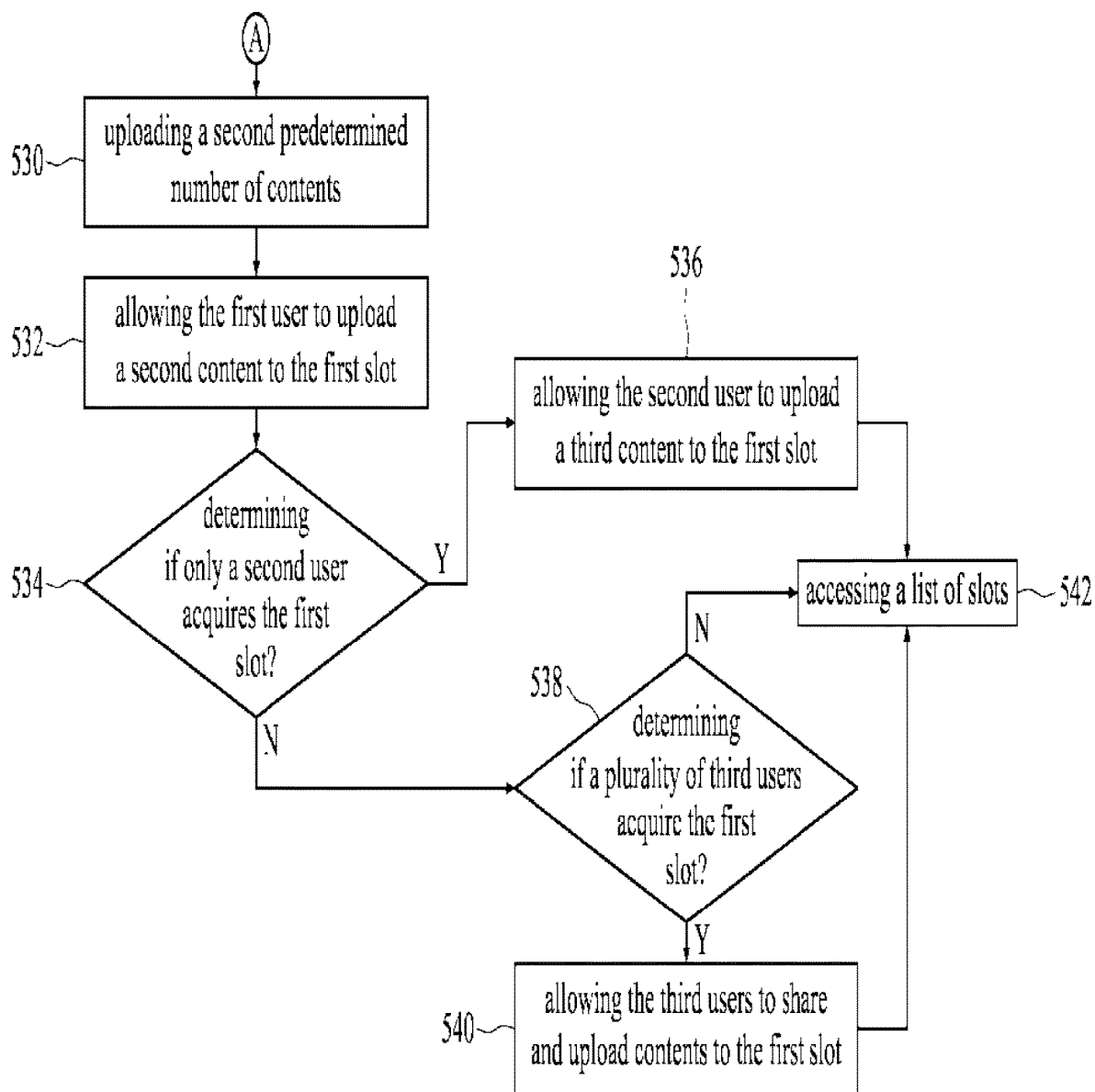
Figure 11C:
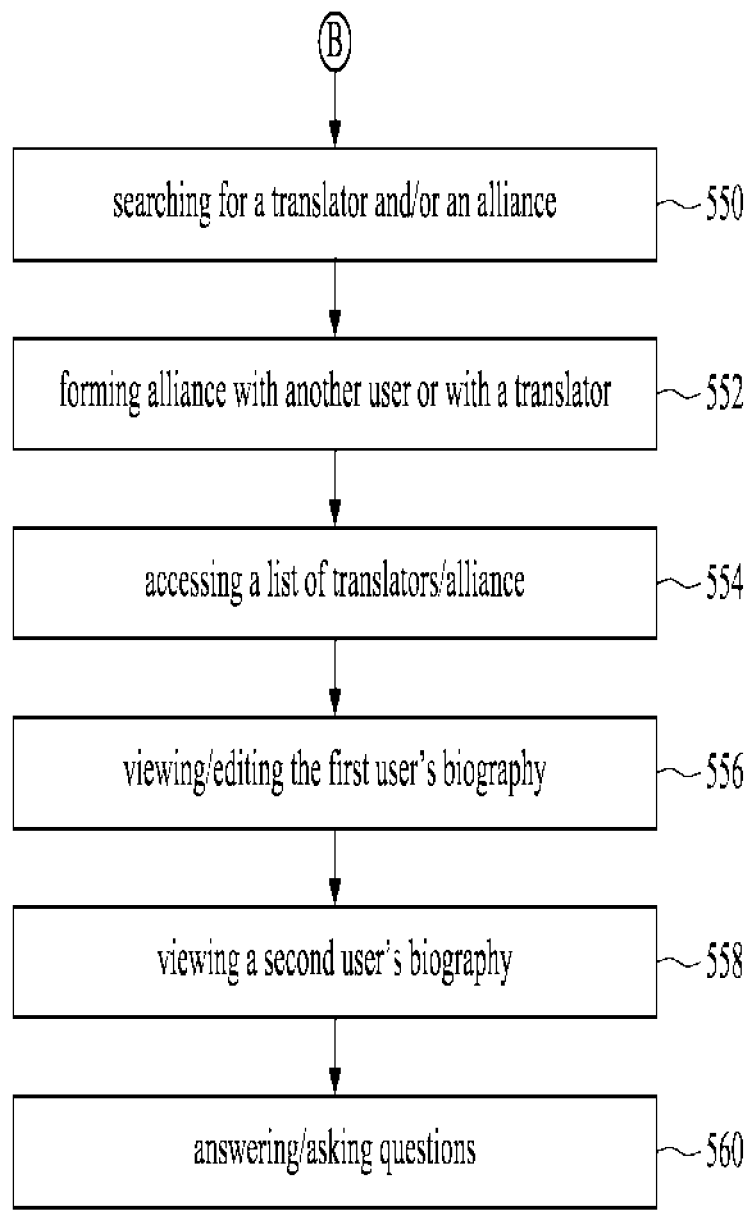

FIGS. 11A to 11C are flow diagrams showing a method for integration among content publication, advertisement services and rewards collection in accordance with an embodiment of the present invention. Referring to FIG. 11A, at step 502, a user, for example, a first user in the system may be allowed to view a limited number of materials without logging in or registering the system. In one embodiment, the materials may include those of the top three newest, most viewed, most recommended and most translated.

At step 504, the first user is requested to register the system, if he/she is the first-time user, or log in the system if he/she has registered the system. Specifically, a first-time user of the system would submit required information to create an account and he/she will be assigned a personal number (or ID) to access to the system. Otherwise, for a user who already has created an account and has been assigned a personal number (or ID), he/she can log in the system with the email address he/she used to create the account and his/her previously created password.

At step 506, the first user is allowed to upload a first predetermined number of contents. In one embodiment, all users start with three opportunities to draft SDS initially. However, in another embodiment, in terms of drafting memorandums (aka Memo), a user is not restricted to a certain number of memorandums he/she may publish initially. The system can be programmed so that such restriction exists or not. As such, at step 506 the first user may upload a first content, which in one embodiment may include an SDS or other materials the first user would like to publish online, and in another embodiment may include briefings/memorandums that can contain any types of content ranging from technology to food to fashion (writing a memorandum can be similar to writing an entry for a journal or for a blog.). The first content may then be published for public viewing.

Next, at step 508, the amount of a predetermined condition of the first content is calculated. In one embodiment according to the present invention, the predetermined condition of the first content includes one of the number of recommendations on the published first content, the number of viewers of the published first content and the number of translations of the published first content.

It is then determined at step 510 whether the amount of the predetermined condition of the published first content reaches a first predetermined threshold, for example, as illustrated in one embodiment above, five recommendations are received for a published SDS or Memo. If affirmative, at step 512, a first slot available for a first advertisement is provided. The first slot, in the form of a parcel of Green Real Estate (aka GRE) or an empty space/slot surrounding the published contents, may subsequently be put through an auction process.

Unlike most bidding systems where values of contents and the prices of their surrounding area (which may be available for advertisements or similar uses or other uses such as sending greeting cards) are decided by advertisers or advertisement services providers, this method and system according the present invention allows the first user, i.e., the content publisher, to decide on the value of his/her contents and set a first price for the first slot at step 514.

It may then be further determined at step 516 whether the predetermined condition of the published first content reaches a second predetermined threshold, for example, ten recommendations are received for the published contents (i.e. SDS/memorandums). If not, at step 518, the system calculates the amount of the predetermined condition until it reaches the second threshold. If affirmative, at step 520, a second slot available for a second advertisement is then provided and the first user is allowed to set a second price for the second slot at step 522.

Referring to FIG. 11B, when the first slot is provided at step 512 in FIG. 11A, in one embodiment, the first user is allowed to publish a second predetermined number of contents at step 530. A similar process from steps 508 to 522 as illustrated in FIG. 11A may be repeated for the second predetermined number of contents. For example, an additional 3 SDS or memos may be allowed to be published when the first slot is provided at step 512. At step 510, it is to be determined that whether an amount of a predetermined condition of the published second content (e.g., the additional three SDS or memos) reaches a predetermined threshold, (e.g., five recommendations are received for one of three additional SDS or memos). If affirmative, at step 512, an additional slot may become available. The additional slot granted based on the predetermined condition of the published second content may be in the form of a parcel of Green Real Estate (aka GRE) or an empty space/slot surrounding the published contents, and may subsequently be put through an auction process.

Accordingly, in one embodiment, a user should seek recognition by earning recommendations, so he/she could publish more contents and make money by selling more slots. In an embodiment where a user gains at least five recommendations on a published content, he/she gains one opportunity to publish another content, and one opportunity to price an advertisement slot for sale. A user can potentially earn endless opportunities to sell slots available for advertisements, as long as he earns five-multiples of recommendations. That is, a user can earn two opportunities to price and sell advertisements slots when he/she earns ten recommendations on one of his/her published content. When a user earns fifty recommendations, he/she has earned him/herself ten advertisements slots (aka GRE) to price and sell to make money.

At step 532, no matter whether any contents are further uploaded at step 530 for public viewing, the first user is allowed to upload a second content to the first slot intended for sale. The second content in one embodiment may include but is not limited to a piece of artwork, a photo, an image and a logo.

At step 534, the system determines if only a second user has acquired the first slot via, for example, bidding (another embodiment shows that a user may purchase a slot directly instead of going through an auction process). If affirmative, at step 536, the second user is allowed to upload a third content to the first slot. The third content can range from contents such as advertising for a company's services to sending greeting cards to the seller of the first slot. The third content serves for an advertisement purpose in general. At step 542, either the first user or the second user may access a list of slots to observe a list of sold/unsold/contents-filled/current-selling slots.

If not, in one embodiment, at step 538, the system determines whether a plurality of third users have acquired the first slot. If affirmative, at step 540, the third users may share the first slot and upload their contents for advertisement purposes or other uses to the first slot. In one embodiment, the highest three bidders of the first slot all acquire rights to utilize the first slot. Moreover, the position of their share in the first slot depends on their bid amounts. For example, the higher his/her bid amount, the higher or better position his/her share in the first slot is. The system can also be programmed in such a way that the higher his/her bid amount is, the bigger size slot he/she can acquire to upload, for example, a larger photo/image/artwork or more contents. Such third users, at step 542, can access a list of slots he/she has acquired but not yet uploaded contents, or a list of slots he/she has uploaded contents, or browsed a list of other for-sale slots.

On the other hand, if the system determines that a plurality of third users has not acquired the first slot, at step 542, in one embodiment, the first user is allowed to keep a list of slots, showing the slots on auction, sold and not sold, and to view other users' for-sale slots if he/she desires.

Referring to FIG. 11C, after logging in at step 504 shown in FIG. 11A, the first user gains access to his/her main menu, i.e., "Mission Office," where he/she may search for a translator and/or an alliance at step 550, form alliance with another user or a translator at step 552, access a list of translators/alliance at step 554, view/edit his/her own biography at step 556, view another user's biography at step 558 and answer/ask questions at step 560. More specifically, through the described various embodiments of the present invention, the first user can receive updates of his/her alliance and/or translators and/or other individuals/organized bodies, update his/her biography, find alliance/translators, publish contents, make money with his/her slots, publish briefings and/or participate in Q&A sessions. At the time, a user may also read other users' contents, bid on other people's slots and visit other users' "Mission Offices" to invite alliance, seek translators, attend briefings, participate in Q&A sessions and/or read about their biographies.

It should be understood that the method steps, processes, and operations described herein are not to be construed as necessarily requiring their performance in the particular order discussed or illustrated, unless specifically identified as an order or performance. For example, persons having ordinary skill in the art will understand that the sequence of the steps 550 to 560 as illustrated in FIG. 11C is insignificant and may be interchangeable. It should also be understood that additional or alternative steps may be employed.

This method and system allows users to report both their personal and national Sustainable Development Strategies (SDS) in a standardized and commonly understandable format. Further, the system and method allows users from different countries to exchange environmentally friendly strategies, ideas, acts, policies, trends, other related information, any international affairs and political information efficiently and without language barriers. Moreover, this system and method has the capabilities to allow users to publish and exchange any information he/she wishes. At the same time, by using this method and system, users can receive financial rewards (compensation) for publishing, especially quality, contents online. In addition, without actually attending international meetings such as the United Nations' General Assembly or becoming an elected official in his/her country or joining the government workforce in his/her country, a user may use this system and method to become representatives of his/her countries, to report his/her SDS, to publish memorandums (aka Memo) that can contain any types of contents, educate others his/her SDS, build international alliances, teach others about his/her country's "green culture," sharpen language skills and assist with the exchange of SDS by offering translations, and learn the latest green trends/ideas/products/strategies.

It should be noted that the method and system described here for receiving financial compensation (rewards) for publishing recommended SDS can be applied in general. That is, the system can be programmed in such a way that a user may not necessarily need to publish Sustainable Development Strategies (SDS) and/or other related information to earn recommendations in order to sell the his/her "online real estate" (aka "GRE-Green Real Estate"). In other words, a user could publish any other types of contents besides SDS and sell advertisement slots, earning recommendations or not, to make money.

For example, this system and method has the option of including a blog-like service (aka "Memo" for publishing memorandums that could contain any types of contents and briefings that could contain links, photos, videos and press releases, etc.). That is, a user may publish anything he/she desires, decide on the value (price it) of the empty space that appears surrounding his/her published content, and sell it to make profits (whether through an auction or not). Also, again, the profit sharing scenarios between the seller (owner) of the empty space (who is also the content publisher) and the owner of the system can vary depending on how the system is programmed. For example, a seller of the empty space may earn anywhere between zero to one hundred percent of the advertisement slots (aka GRE) he/she sold, while the owner may collect anywhere between zero to one hundred percent of the value of the sold empty space.

This system and method allows users to claim the empty space that appears next to or surrounding his/her published content as his/her own after creating an account on the system. In so doing, a user can sell the rights of his/her "online properties" (i.e., empty space that appears next to or surrounding his/her published content, aka Green Real Estate-GRE) to other users of the system for advertisement purposes or similar uses or other uses that are legal and appropriate.

Although the present invention has been described with reference to specific embodiments, it is evident that various modifications and changes may be made to these embodiments without departing from the broader spirit and scope of the following claims. Accordingly, the specification and drawings are to be regarded in an illustrative rather than a restrictive sense.

What is claimed is:

1. A content management system for managing content that includes standardized data, the system comprising a server including a database and a processor, the processor configured to:
   receive first generated contents from one or more user devices associated with a user over a communication network, wherein the first generated contents comprise standardized data;
   publish the first generated contents so that it is accessible to user devices via the communication network;
   manage the standardized data in the database for searching;
   determine that a first predetermined condition of at least one of the published first generated contents has reached a first predetermined threshold;
   responsive to the determination that the first predetermined condition of the at least one of the published first generated contents has reached the first predetermined threshold:
      (i) modify a page where the at least one of the first generated contents is published to include a first user-controlled slot where additional content may be displayed;
      (ii) set a limited time period for the user to set a price for the first user-controlled slot; and
      (iii) display a temporary link on an interface accessible to the user, wherein the temporary link is configured to enable the user to set the price for the first user-controlled slot upon selection by the user, and wherein the temporary link is not selectable after the limited time period has passed;
   receive second generated contents from the one or more user devices associated with the user over the communication network;
   publish the second generated contents so that it is accessible to user devices via the communication network;
   determine that a first predetermined condition of the published second generated contents has reached a second predetermined threshold; and
   responsive to the determination that the first predetermined condition of the published second generated contents has reached the second predetermined threshold:
      (i) modify the page where at least one of the first generated contents is published to include a second user-controlled slot where additional content may be displayed; and
      (ii) enable user management of at least one criterion for using the second user-controlled slot.

2. The content management system of claim 1, wherein the standardized data comprises at least one of:
   a monetary valuation that may be generated;
   a calculation method for the monetary valuation that may be generated;
   a monetary valuation that may be saved; a calculation method for the monetary valuation that may be saved;
   a carbon emission reduction; and
   a language used to generate the first generated content.

3. The content management system of claim 2, wherein the database is configured to receive a translation of at least one of the published first generated content.

4. The content management system of claim 3, wherein the translation is submitted by a user different from the user.

5. The content management system of claim 1, wherein the first predetermined condition of the at least one published first generated contents includes at least one of:
   a number of recommendations on the at least one published first generated contents;
   a number of viewers of the at least one published first generated contents;
   a number of questions posted by the first user;
   a number of answers provided by the first user; and
   a number of translations of the at least one published first generated contents.

6. The content management system of claim 5, wherein the server uses the number of recommendations on the at least one published first generated contents as a basis for at least one of:
   a number of publication opportunities available to the first user;
   a number of slots available for the first user to sell; and
   a percentage of profits received by the first user when one or more slots are sold.

7. The content management system of claim 1, further comprising: automatically, dividing money received for the first slot based on respective profit-sharing percentages for the first user and a system owner.

8. The content management system of claim 1, further comprising:
   automatically dividing money received for the first slot based on respective profit-sharing percentages for the first user, a system owner, and a broker.

9. A computer-implemented method for integration among content publication, advertisement services and rewards collection, the method comprising:
   receiving, by a server, first generated contents from one or more user devices associated with a user over a communication network, wherein the first generated contents comprise standardized data;
   publishing, by the server, the first generated contents so that it is accessible as published first generated contents to user devices via the communication network;
   managing, by the server, the standardized data in a database for searching;
   determining, by the server, that a first predetermined condition of at least one of the published first generated contents has reached a first predetermined threshold;
   responsive to the determination that the first predetermined condition of the at least one of the published first generated contents has reached the first predetermined threshold:
      (i) modifying, by the server, a page where the at least one of the first generated contents is published to include a first user-controlled slot where additional content may be displayed;
      (ii) setting, by the server, a limited time period for the user to set a price for the first user-controlled slot; and (iii) displaying, by the server, a temporary link on an interface accessible to the user, wherein the temporary link is configured to enable the user to set the price for the first user-controlled slot upon selection by the user, and wherein the temporary link is not selectable after the limited time period has passed;

receiving, by the server, second generated contents from the one or more user devices associated with the user over the communication network;

publishing, by the server, the second generated contents so that it is accessible to user devices via the communication network;

determining, by the server, that a first predetermined condition of the published second generated contents has reached a second predetermined threshold; and responsive to the determination that the first predetermined condition of the published second generated contents has reached the second predetermined threshold:

(i) modifying, by the server, the page where at least one of the first generated contents is published to include a second user-controlled slot where additional content may be displayed; and (ii) enabling, by the server, user management of at least one criterion for using the second user-controlled slot.

10. The method of claim 9, further comprising searching, by the server, the published first generated contents according to standardized data.

11. The method of claim 9, further comprising providing, by the server, a format for evaluation of the published first generated contents according to standardized data.

12. The method of claim 9, wherein the first user-controlled slot is configured to receive an image.

13. The method of claim 12, wherein the image comprises at least one of a greeting card, a photo, a piece of artwork, and a logo.

14. The method of claim 9, wherein the first predetermined condition of the at least one published first generated contents includes at least one of:
 a number of recommendations on the at least one published first generated contents,
 a number of viewers of the at least one published first generated contents,
 a number of questions posted by the user,
 a number of answers provided by the user, and
 a number of translations of the at least one published first generated contents.

15. The method of claim 14, wherein the server uses the number of recommendations on the at least one published first generated contents as a basis for at least one of:
 a number of publication opportunities available to the first user;
 a number of slots available for the first user to sell; and
 a percentage of profits received by the first user when one or more slots are sold.

16. The method of claim 9, further comprising:
 automatically dividing money received for the first slot based on respective profit-sharing percentages for the first user and a system owner.

17. The method of claim 9, further comprising:
 automatically dividing money received for the first slot based on respective profit-sharing percentages for the first user, a system owner, and a broker.

* * * * *